United States Patent
Wang et al.

(10) Patent No.: US 9,354,374 B2
(45) Date of Patent: May 31, 2016

(54) POLARIZER WITH WIRE PAIR OVER RIB

(71) Applicant: Moxtek, Inc., Orem, UT (US)

(72) Inventors: Bin Wang, Lindon, UT (US); Ted Wangensteen, Pleasant Grove, UT (US); Rumyana Petrova, Pleasant Grove, UT (US); Mike Black, Orem, UT (US); Steven Marks, Orem, UT (US); Dean Probst, West Jordan, UT (US); Mark Alan Davis, Springville, UT (US)

(73) Assignee: Moxtek, Inc., Orem, UT (US)

( * ) Notice: Subject to any disclaimer, the term of this patent is extended or adjusted under 35 U.S.C. 154(b) by 163 days.

(21) Appl. No.: 14/470,498

(22) Filed: Aug. 27, 2014

(65) Prior Publication Data

US 2015/0116824 A1   Apr. 30, 2015

Related U.S. Application Data

(60) Provisional application No. 61/924,569, filed on Jan. 7, 2014, provisional application No. 61/924,560, filed on Jan. 7, 2014, provisional application No. 61/895,225, filed on Oct. 24, 2013.

(51) Int. Cl.
| | |
|---|---|
| *G02B 5/30* | (2006.01) |
| *G02B 1/08* | (2006.01) |
| *G02B 1/12* | (2006.01) |
| *C23F 17/00* | (2006.01) |

(52) U.S. Cl.
CPC .............. *G02B 5/3058* (2013.01); *C23F 17/00* (2013.01); *G02B 1/08* (2013.01); *G02B 1/12* (2013.01)

(58) Field of Classification Search
CPC .......... G02B 5/3058; G02B 1/08; G02B 1/12; C23F 17/00
USPC ................................ 359/485.05, 487.03, 900
See application file for complete search history.

(56) References Cited

U.S. PATENT DOCUMENTS

| 2,224,214 A | 12/1940 | Brown |
|---|---|---|
| 2,237,567 A | 4/1941 | Land |

(Continued)

FOREIGN PATENT DOCUMENTS

| CN | 1438544 A | 8/2003 |
|---|---|---|
| CN | 1692291 | 11/2005 |

(Continued)

OTHER PUBLICATIONS

Auton et al.; "Grid Polarizers for Use in the Near Infrared." Infrared Physics, 1972, vol. 12, pp. 95-100.

(Continued)

*Primary Examiner* — Ricky D Shafer
(74) *Attorney, Agent, or Firm* — Thorpe, North & Western, LLP

(57) ABSTRACT

Wire grid polarizers, and methods of making wire grid polarizers, including an array of parallel, elongated nano-structures disposed over a surface of a substrate. Each of the nano-structures can include a first rib disposed over a surface of a substrate and a pair of parallel, elongated wires, each laterally oriented with respect to one another, and disposed over the first rib. The wire grid polarizers can be durable with high transmission of one polarization of light, high contrast, and/or small pitch. The wire grid polarizers can also have high absorption or high reflection of an opposite polarization of light.

20 Claims, 9 Drawing Sheets

(56) References Cited

U.S. PATENT DOCUMENTS

| | | |
|---|---|---|
| 2,287,598 A | 6/1942 | Brown |
| 2,391,451 A | 12/1945 | Fischer |
| 2,403,731 A | 7/1946 | MacNeille |
| 2,605,352 A | 7/1952 | Fischer |
| 2,748,659 A | 6/1956 | Geffcken et al. |
| 2,813,146 A | 11/1957 | Glenn |
| 2,815,452 A | 12/1957 | Mertz |
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,124,841 A | 6/1992 | Oishi |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |

(56) References Cited

U.S. PATENT DOCUMENTS

| | | |
|---|---|---|
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |
| 5,706,063 A | 1/1998 | Hong |
| 5,706,131 A | 1/1998 | Ichimura et al. |
| 5,719,695 A | 2/1998 | Heimbuch |
| 5,731,246 A | 3/1998 | Bakeman et al. |
| 5,748,368 A | 5/1998 | Tamada et al. |
| 5,748,369 A | 5/1998 | Yokota |
| 5,751,388 A | 5/1998 | Larson |
| 5,751,466 A | 5/1998 | Dowling et al. |
| 5,767,827 A | 6/1998 | Kobayashi et al. |
| 5,798,819 A | 8/1998 | Hattori et al. |
| 5,808,795 A | 9/1998 | Shimomura et al. |
| 5,826,959 A | 10/1998 | Atsuchi |
| 5,826,960 A | 10/1998 | Gotoh et al. |
| 5,828,489 A | 10/1998 | Johnson et al. |
| 5,833,360 A | 11/1998 | Knox et al. |
| 5,838,403 A | 11/1998 | Jannson et al. |
| 5,841,494 A | 11/1998 | Hall |
| 5,844,722 A | 12/1998 | Stephens et al. |
| 5,864,427 A | 1/1999 | Fukano et al. |
| 5,886,754 A | 3/1999 | Kuo |
| 5,890,095 A | 3/1999 | Barbour et al. |
| 5,898,521 A | 4/1999 | Okada |
| 5,899,551 A | 5/1999 | Neijzen et al. |
| 5,900,976 A | 5/1999 | Handschy et al. |
| 5,907,427 A | 5/1999 | Scalora et al. |
| 5,912,762 A | 6/1999 | Li et al. |
| 5,914,818 A | 6/1999 | Tejada et al. |
| 5,917,562 A | 6/1999 | Woodgate et al. |
| 5,918,961 A | 7/1999 | Ueda |
| 5,930,050 A | 7/1999 | Dewald |
| 5,943,171 A | 8/1999 | Budd et al. |
| 5,958,345 A | 9/1999 | Turner et al. |
| 5,965,247 A | 10/1999 | Jonza et al. |
| 5,969,861 A | 10/1999 | Ueda et al. |
| 5,973,833 A | 10/1999 | Booth et al. |
| 5,978,056 A | 11/1999 | Shintani et al. |
| 5,982,541 A | 11/1999 | Li et al. |
| 5,986,730 A | 11/1999 | Hansen et al. |
| 5,991,075 A | 11/1999 | Katsuragawa et al. |
| 5,991,077 A | 11/1999 | Carlson et al. |
| 6,005,918 A | 12/1999 | Harris et al. |
| 6,008,871 A | 12/1999 | Okumura |
| 6,008,951 A | 12/1999 | Anderson |
| 6,010,121 A | 1/2000 | Lee |
| 6,016,173 A | 1/2000 | Crandall |
| 6,018,841 A | 2/2000 | Kelsay et al. |
| 6,046,851 A | 4/2000 | Katayama |
| 6,049,428 A | 4/2000 | Khan et al. |
| 6,053,616 A | 4/2000 | Fujimori et al. |
| 6,055,103 A | 4/2000 | Woodgate et al. |
| 6,055,215 A | 4/2000 | Katsuragawa |
| 6,056,407 A | 5/2000 | Iinuma et al. |
| 6,062,694 A | 5/2000 | Oikawa et al. |
| 6,075,235 A | 6/2000 | Chun |
| 6,081,312 A | 6/2000 | Aminaka et al. |
| 6,081,376 A | 6/2000 | Hansen et al. |
| 6,082,861 A | 7/2000 | Dove et al. |
| 6,089,717 A | 7/2000 | Iwai |
| 6,096,155 A | 8/2000 | Harden et al. |
| 6,096,375 A | 8/2000 | Ouderkirk et al. |
| 6,100,928 A | 8/2000 | Hata |
| 6,108,131 A | 8/2000 | Hansen et al. |
| 6,122,103 A | 9/2000 | Perkins et al. |
| 6,122,403 A | 9/2000 | Rhoads |
| 6,124,971 A | 9/2000 | Ouderkirk et al. |
| 6,141,075 A | 10/2000 | Ohmuro et al. |
| 6,147,728 A | 11/2000 | Okumura et al. |
| 6,172,813 B1 | 1/2001 | Tadic-Galeb et al. |
| 6,172,816 B1 | 1/2001 | Tadic-Galeb et al. |
| 6,181,386 B1 | 1/2001 | Knox |
| 6,181,458 B1 | 1/2001 | Brazas, Jr. et al. |
| 6,185,041 B1 | 2/2001 | Tadic-Galeb et al. |
| 6,208,463 B1 | 3/2001 | Hansen et al. |
| 6,215,547 B1 | 4/2001 | Ramanujan et al. |
| 6,234,634 B1 | 5/2001 | Hansen et al. |
| 6,243,199 B1 | 6/2001 | Hansen et al. |
| 6,247,816 B1 | 6/2001 | Cipolla et al. |
| 6,249,378 B1 | 6/2001 | Shimamura et al. |
| 6,250,762 B1 | 6/2001 | Kuijper |
| 6,251,297 B1 | 6/2001 | Komuro et al. |
| 6,282,025 B1 | 8/2001 | Huang et al. |
| 6,288,840 B1 | 9/2001 | Perkins et al. |
| 6,291,797 B1 | 9/2001 | Koyama et al. |
| 6,310,345 B1 | 10/2001 | Pittman et al. |
| 6,339,454 B1 | 1/2002 | Knox |
| 6,340,230 B1 | 1/2002 | Bryars et al. |
| 6,345,895 B1 | 2/2002 | Maki et al. |
| 6,348,995 B1 | 2/2002 | Hansen et al. |
| 6,375,330 B1 | 4/2002 | Mihalakis |
| 6,390,626 B2 | 5/2002 | Knox |
| 6,398,364 B1 | 6/2002 | Bryars |
| 6,406,151 B1 | 6/2002 | Fujimori |
| 6,409,525 B1 | 6/2002 | Hoelscher et al. |
| 6,411,749 B2 | 6/2002 | Teng et al. |
| 6,424,436 B1 | 7/2002 | Yamanaka |
| 6,426,837 B1 | 7/2002 | Clark et al. |
| 6,447,120 B2 | 9/2002 | Hansen et al. |
| 6,452,724 B1 | 9/2002 | Hansen et al. |
| 6,460,998 B1 | 10/2002 | Watanabe |
| 6,473,236 B2 | 10/2002 | Tadic-Galeb et al. |
| 6,486,997 B1 | 11/2002 | Bruzzone et al. |
| 6,490,017 B1 | 12/2002 | Huang et al. |
| 6,496,239 B2 | 12/2002 | Seiberle |
| 6,496,287 B1 | 12/2002 | Seiberle et al. |
| 6,511,183 B2 | 1/2003 | Shimizu et al. |
| 6,514,674 B1 | 2/2003 | Iwasaki |
| 6,520,645 B2 | 2/2003 | Yamamoto et al. |
| 6,532,111 B2 | 3/2003 | Kurtz et al. |
| 6,547,396 B1 | 4/2003 | Svardal et al. |
| 6,580,471 B2 | 6/2003 | Knox |
| 6,583,930 B1 | 6/2003 | Schrenk et al. |
| 6,585,378 B2 | 7/2003 | Kurtz et al. |
| 6,624,936 B2 | 9/2003 | Kotchick et al. |
| 6,643,077 B2 | 11/2003 | Magarill et al. |
| 6,654,168 B1 | 11/2003 | Borrelli |
| 6,661,475 B1 | 12/2003 | Stahl et al. |
| 6,661,484 B1 | 12/2003 | Iwai et al. |
| 6,665,119 B1 | 12/2003 | Kurtz et al. |
| 6,666,556 B2 | 12/2003 | Hansen et al. |
| 6,669,343 B2 | 12/2003 | Shahzad et al. |
| 6,698,891 B2 | 3/2004 | Kato |
| 6,704,469 B1 | 3/2004 | Xie et al. |
| 6,710,921 B2 | 3/2004 | Hansen et al. |
| 6,713,396 B2 * | 3/2004 | Anthony ............ B82Y 10/00 438/694 |
| 6,714,350 B2 | 3/2004 | Silverstein et al. |
| 6,721,096 B2 | 4/2004 | Bruzzone et al. |
| 6,739,723 B1 | 5/2004 | Haven et al. |
| 6,746,122 B2 | 6/2004 | Knox |
| 6,764,181 B2 | 7/2004 | Magarill et al. |
| 6,769,779 B1 | 8/2004 | Ehrne et al. |
| 6,781,640 B1 | 8/2004 | Huang |
| 6,785,050 B2 | 8/2004 | Lines et al. |
| 6,788,461 B2 | 9/2004 | Kurtz et al. |
| 6,805,445 B2 | 10/2004 | Silverstein et al. |
| 6,809,864 B2 | 10/2004 | Martynov et al. |
| 6,809,873 B2 | 10/2004 | Cobb |
| 6,811,274 B2 | 11/2004 | Olczak |
| 6,813,077 B2 | 11/2004 | Borrelli et al. |
| 6,816,290 B2 | 11/2004 | Mukawa |
| 6,821,135 B1 | 11/2004 | Martin |
| 6,823,093 B2 | 11/2004 | Chang et al. |
| 6,829,090 B2 | 12/2004 | Katsumata et al. |
| 6,844,971 B2 | 1/2005 | Silverstein et al. |
| 6,846,089 B2 | 1/2005 | Stevenson et al. |
| 6,859,303 B2 | 2/2005 | Wang et al. |

(56) References Cited

U.S. PATENT DOCUMENTS

| | | |
|---|---|---|
| 6,876,784 B2 | 4/2005 | Nikolov et al. |
| 6,896,371 B2 | 5/2005 | Shimizu et al. |
| 6,897,926 B2 | 5/2005 | Mi et al. |
| 6,899,440 B2 | 5/2005 | Bierhuizen |
| 6,900,866 B2 | 5/2005 | Kurtz et al. |
| 6,909,473 B2 | 6/2005 | Mi et al. |
| 6,920,272 B2 | 7/2005 | Wang |
| 6,922,287 B2 | 7/2005 | Wiki et al. |
| 6,926,410 B2 | 8/2005 | Weber et al. |
| 6,927,915 B2 | 8/2005 | Nakai |
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,026,046 B2 | 4/2006 | Edlinger et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,297,386 B2 | 11/2007 | Suzuki et al. |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,466,484 B2 | 12/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 | 10/2010 | Perkins et al. |
| 7,944,544 B2 | 5/2011 | Amako et al. |
| 7,961,393 B2 | 6/2011 | Perkins et al. |
| 8,009,355 B2 | 8/2011 | Nakai |
| 8,027,087 B2 | 9/2011 | Perkins et al. |
| 8,049,841 B2 | 11/2011 | Sugita et al. |
| 8,138,534 B2 | 3/2012 | Adkisson et al. |
| 8,248,697 B2 | 8/2012 | Kenmochi |
| 8,426,121 B2 | 4/2013 | Brueck et al. |
| 8,493,658 B2 | 7/2013 | Nishida et al. |
| 8,506,827 B2 | 8/2013 | Wu et al. |
| 8,611,007 B2 | 12/2013 | Davis |
| 8,619,215 B2 | 12/2013 | Kumai |
| 8,696,131 B2 | 4/2014 | Sawaki |
| 8,709,703 B2 | 4/2014 | Deng et al. |
| 8,755,113 B2 | 6/2014 | Gardner et al. |
| 8,804,241 B2 | 8/2014 | Wu et al. |
| 8,808,972 B2 | 8/2014 | Wang et al. |
| 8,913,321 B2 | 12/2014 | Davis |
| 9,097,857 B2 * | 8/2015 | Hanashima ............ B82Y 20/00 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hansen et al. |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0112190 A1 | 6/2003 | Ballarda et al. |
| 2003/0117708 A1 | 6/2003 | Kane |
| 2003/0142400 A1 | 7/2003 | Hansen et al. |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0141108 A1 | 7/2004 | Tanaka et al. |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227923 A1 | 11/2004 | Flagello et al. |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarly et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |

(56) References Cited

U.S. PATENT DOCUMENTS

| | | |
|---|---|---|
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0056024 A1 | 3/2006 | Ahn et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0018997 A1* | 1/2008 | Kawazu ............... G02B 5/3058 359/487.03 |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1 | 1/2009 | Nishida et al. |
| 2009/0040607 A1 | 2/2009 | Amako et al. |
| 2009/0041971 A1 | 2/2009 | Wang et al. |
| 2009/0052030 A1* | 2/2009 | Kaida ............... B82Y 10/00 359/485.05 |
| 2009/0053655 A1 | 2/2009 | Deng et al. |
| 2009/0109377 A1 | 4/2009 | Sawaki et al. |
| 2009/0231702 A1 | 9/2009 | Wu et al. |
| 2010/0072170 A1* | 3/2010 | Wu ............... G02B 5/3058 216/13 |
| 2010/0091236 A1 | 4/2010 | Matera et al. |
| 2010/0103517 A1 | 4/2010 | Davis et al. |
| 2010/0188747 A1 | 7/2010 | Ammako et al. |
| 2010/0225832 A1 | 9/2010 | Kumai |
| 2010/0238555 A1 | 9/2010 | Amako et al. |
| 2010/0239828 A1 | 9/2010 | Cornaby |
| 2010/0328768 A1 | 12/2010 | Lines |
| 2010/0328769 A1 | 12/2010 | Perkins |
| 2011/0037928 A1 | 2/2011 | Little |
| 2011/0080640 A1 | 4/2011 | Kaida et al. |
| 2011/0096396 A1 | 4/2011 | Kaida et al. |
| 2011/0115991 A1 | 5/2011 | Sawaki |
| 2011/0235181 A1 | 9/2011 | Hayashibe et al. |
| 2012/0008205 A1 | 1/2012 | Perkins et al. |
| 2012/0075699 A1 | 3/2012 | Davis et al. |
| 2012/0086887 A1 | 4/2012 | Lee et al. |
| 2012/0105745 A1* | 5/2012 | Kumai ............... G02B 5/3058 349/5 |
| 2012/0206805 A1 | 8/2012 | Meng et al. |
| 2012/0250154 A1 | 10/2012 | Davis |
| 2013/0043956 A1 | 2/2013 | Salit et al. |
| 2013/0077164 A1 | 3/2013 | Davis |
| 2013/0128358 A1 | 5/2013 | Hanashima |
| 2013/0153534 A1 | 6/2013 | Resnick et al. |
| 2013/0155516 A1 | 6/2013 | Lines et al. |
| 2013/0201557 A1 | 8/2013 | Davis |
| 2013/0250411 A1 | 9/2013 | Bangerter et al. |
| 2013/0258471 A1 | 10/2013 | Davis |
| 2014/0300964 A1 | 10/2014 | Davis et al. |
| 2015/0077851 A1 | 3/2015 | Wang et al. |
| 2015/0116825 A1 | 4/2015 | Wang et al. |
| 2015/0131150 A1 | 5/2015 | Probst et al. |

FOREIGN PATENT DOCUMENTS

| | | |
|---|---|---|
| CN | 101688939 A | 3/2010 |
| DE | 3707984 A1 | 9/1988 |
| DE | 10327963 | 1/2005 |
| DE | 10341596 | 4/2005 |
| DE | 102004041222 | 3/2006 |
| EP | 300563 | 1/1989 |
| EP | 1347315 A1 | 9/2003 |
| EP | 2270553 | 1/2011 |
| JP | 56156815 | 12/1981 |
| JP | 58-042003 | 3/1983 |
| JP | 61122626 | 6/1986 |
| JP | 1028675 | 1/1989 |
| JP | 2308106 | 12/1990 |
| JP | 3005706 | 1/1991 |
| JP | H 03084502 | 4/1991 |
| JP | 3126910 | 5/1991 |
| JP | 04 366916 | 6/1991 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | H06-138413 | 5/1994 |
| JP | 06-174907 | 6/1994 |
| JP | 6202042 | 7/1994 |
| JP | 7005316 | 1/1995 |
| JP | 7072428 | 3/1995 |
| JP | 7-146469 | 6/1995 |
| JP | 07202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10-153706 | 6/1998 |
| JP | 10-260403 | 9/1998 |
| JP | 10- 268301 | 10/1998 |
| JP | 11-014814 | 1/1999 |
| JP | 11-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000/147487 | 5/2000 |
| JP | 2000/284117 | 10/2000 |
| JP | 2001/074935 | 3/2001 |
| JP | 2002/116302 | 4/2002 |
| JP | 2003/502708 | 1/2003 |
| JP | 2003/207646 | 7/2003 |
| JP | 3486334 B2 | 1/2004 |

(56) References Cited

FOREIGN PATENT DOCUMENTS

| | | |
|---|---|---|
| JP | 2004/157159 | 6/2004 |
| JP | 2004/309903 | 11/2004 |
| JP | 2005/151154 | 6/2005 |
| JP | 2005/195824 | 7/2005 |
| JP | 2005/202104 A | 7/2005 |
| JP | 2005/534981 | 11/2005 |
| JP | 2006/047813 | 2/2006 |
| JP | 2006/133402 | 5/2006 |
| JP | 2006/201540 | 8/2006 |
| JP | 2006/330178 | 12/2006 |
| JP | 2007/058100 | 3/2007 |
| JP | 2007/101859 | 4/2007 |
| JP | 2011/248284 A | 12/2011 |
| KR | 2003-0079268 | 10/2003 |
| KR | 10-2003-0090021 | 11/2003 |
| KR | 10-2004-0046137 | 6/2004 |
| KR | 10-0707083 | 4/2007 |
| KR | 10-2013-0024041 | 3/2013 |
| SU | 1283685 | 1/1987 |
| SU | 1781659 | 12/1992 |
| TW | 200528927 A | 1/2010 |
| WO | WO 96/15474 | 5/1996 |
| WO | WO 99/59005 | 11/1999 |
| WO | WO 00/70386 | 11/2000 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO 03/107046 | 12/2003 |
| WO | WO 2004/013684 | 2/2004 |
| WO | WO 2005/123277 | 12/2005 |
| WO | WO 2006/014408 | 2/2006 |
| WO | WO 2006/036546 | 4/2006 |
| WO | WO 2011/056496 | 5/2011 |

OTHER PUBLICATIONS

Auton; "Infrared Transmission Polarizers by Photolithography." Applied Optics; Jun. 1967; vol. 6, No. 6, pp. 1023-1027.
Baur; "A new type of beam splitting polarizer cube." Meadowlark Optics, 2005, pp. 1-9.
Bird et al.; "The Wire Grid as a Near-Infrared Polarizer." J. Op. Soc. Am. vol. 50 No. 9 (1960).
Brummelaar et al.; "Beam combining optical components," Chara Technical Report, Jan. 5, 1998, pp. TR61-1 to TR 61-17, No. 61.
Bruzzone et al.; "High-performance LCoS optical engine using cartesian polarizer technology;" SID 03 Digest, 2003, pp. 1-4.
Chen et al.; Novel polymer patterns formed by lithographically induced self-assembly (LISA)., American Chemical Society, Jan. 2005, pp. 818-821, vol. 21, No. 3.
Chen et al.; "Optimum film compensation modes for TN and VA LCDs." SID 98 Digest, pp. 315-318, 1998.
Dainty et al.; "Measurements of light scattering by characterized random rough surface." Waves in Random Media 3 (1991).
Deguzman et al.; "Stacked subwavelength gratings as circular polarization filters." Applied Optics, Nov. 1, 2001, pp. 5731-5737, vol. 40, No. 31.
Deng et al.; "Multiscale structures for polarization control by using imprint and UV lithography." Proc. of SPIE, 2005, pp. 1-12. vol. 6003.
Deng et al.; "Wideband antireflective polarizers based on integrated diffractive multilayer microstructures." Optics Letters, Feb. 1, 2006, pp. 344-346, vol. 31., No. 3.
DeSanto et al.; "Rough surface scattering." Waves in Random Media 1 (1991).
Enger et al.; "Optical elements with ultrahigh spatial-frequency surface corrugations." Applied Optics Oct. 15, 1983, vol. 22, No. 20 pp. 3220-3228.
Flanders; "Application of .100 Å linewidth structures fabricated by shadowing techniques." J. Vac. Sci. Technol., 19(4), Nov./Dec. 1981.
Flanders; "Submicron periodicity gratings as artificial anisotropic dielectrics." Appl. Phys. Lett. 42 (6), Mar. 15, 1983, pp. 492-494.

Fritsch et al.; "A liquid-crystal phase modulator for large-screen projection." IEEE, Sep. 1989, pp. 1882-1887, vol. 36, No. 9.
Glytsis et al.; "High-spatial-frequency binary and multilevel stairstep gratings: polarization-selective mirrors and broadband antireflection surfaces." Applied Optics Aug. 1, 1992 vol. 31, No. 22 pp. 4459-4470.
Haggans et al.; "Lamellar gratings as polarization components for specularly reflected beams." Journal of Modern Optics, 1993, vol. 40, No. 4, pp. 675-686.
Haisma et al.; "Mold-assisted nanolithography: a process for reliable pattern replication." Journal Vac. Sci. Technology B, Nov./Dec. 1996, pp. 4124-4128, vol. 14, No. 6.
Handbook of Optics, 1978, pp. 10-68-10-77.
Hass et al.; "Sheet Infrared Transmission Polarizers." Applied Optics Aug. 1965, vol. 4, No. 8 pp. 1027-1031.
Ho et al.; "The mechanical-optical properties of wire-grid type polarizer in projection display system." SID 02 Digest, pp. 648-651, 2002.
Knop; "Reflection Grating Polarizer for the Infrared." Optics Communications vol. 26, No. 3, Sep. 1978.
Kostal et al.; "Adding parts for a greater whole." SPIE's oeMagazine, May 2003, pp. 24-26.
Kostal et al.; "MEMS Meets Nano-optics The marriage of MEMES and nano-optics promises a new and viable platform for tunable optical filters." www.fiberoptictechnology.net, Fiber Optic Technology, Nov. 2005, pp. 8-13.
Kostal; "Nano-optic devices enable integrated fabrication." www.laserfocuswold.com, Jun. 2004 pp. 155, 157-159.
Kostal; "Nano-optics: robust, optical devices for demanding applications." Military & Aerospace Electronics, Jul. 2005, 6 pages.
Kostal; "Using advanced lithography to pattern nano-optic devices;" NanoTechnology; www.solid-state.com, Sep. 2005, p. 26 and 29.
Kuta et al.; "Coupled-wave analysis of lamellar metal transmission gratings for the visible and the infrared." J. Opt. Soc. Am. A/vol. 12, No. 5 /May 1995.
Li Li et al.; "Visible broadband, wide-angle, thin-film multilayer polarizing beam splitter." Applied Optics May 1, 1996, vol. 35, No. 13, pp. 2221-2224.
Lloyd; Manual of Advanced Undergraduate Experiments in Physics, p. 302 (1959).
Lockbihler et al.; "Diffraction from highly conducting wire gratings of arbitrary cross-section." Journal of Modern Optics, 1993, vol. 40, No. 7, pp. 1273-1298.
Lopez et al.; "Wave-plate polarizing beam splitter based on a form-birefringent multilayer grating." Optics Letters, vol. 23, No. 20, pp. 1627-1629, Oct. 15, 1998.
Maystre & Dainty; Modern Analysis of Scattering Phenomena Proceeding from International Workshop held at Domaine deTournon, Aix en Provence, France Sep. 5-8, 1990.
Moshier et al.; "The Corrosion and Passively of Aluminum Exposed to Dilute Sodium Sulfate Solutions." Corrosion Science vol. 27. No. 8 pp. 785-801; (1987).
N.M. Ceglio; Invited Review "Revolution in X-Ray Optics." J. X-Ray Science & Tech. 1; pp. 7-78 (1989).
Nordin et al.; "Micropolarizer array for infrared imaging polarimetry." J. Op. Soc. Am. A. vol. 16 No. 5, May 1999.
Novak et al.; "Far infrared polarizing grids for use at cryogenic temperatures." Applied Optics, Aug. 15, 1989/vol. 28, No. 15, pp. 3425-3427.
Optics $9^{th}$ Edition, pp. 338-339; (1980).
PCT Application No.: PCT/US2012/043979; Filing date Jun. 25, 2012; Moxtek, Inc. et al.; International Search Report dated Feb. 1, 2013.
PCT Application No.: PCT/US2014/045287; Filing date Jul. 2, 2014; Moxtek, Inc.; International Search Report mailed Nov. 7, 2014.
PCT Application No.: PCT/US2008/055685; Filing date Mar. 3, 2008; Moxtek, Inc. et al.; International Search Report mailed Jun. 27, 2008.
PCT Application No.: PCT/US2014/053083; Filing date Aug. 28, 2014; Moxtek, Inc.; International Search Report mailed Dec. 8, 2014.
PCT Application No.: PCT/US2014/053161; Filing date Aug. 28, 2014; Moxtek, Inc.; International Search Report mailed Dec. 8, 2014.
PCT Application No.: PCT/US2014/053216; Filing date Aug. 28, 2014; Moxtek, Inc.; International Search Report mailed Dec. 8, 2014.

(56) References Cited

OTHER PUBLICATIONS

Pentico et al.; "New, High Performance, Durable Polarizers for Projection Displays." SID 01 Digest, 2001, pp. 1287-1289.

Richter et al.; "Design considerations of form birefringent microstructures." Applied Optics, vol. 34, No. 14, pp. 2421-2429, May 10, 1995.

Robinson et al.; "Wide Field of View Compensation Scheme for Cube Polarizing Beam Splitters." SID 03 Digest, pp. 1-4, www.colorlink.com.

Savas et al.; "Achromatic interferometric lithography for 100-nm-period gratings and grids." Journal Vac. Sci. Technology B, Nov./Dec. 1995, pp. 2732-2735, vol. 13, No. 6.

Scandurra et al.; "Corrosion Inhibition of Al Metal in Microelectronic Devices Assemble in Plastic Packages." Journal of the Electrochemical Society, 148 (8) B289-B292 (2001).

Sonek et al.; "Ultraviolet grating polarizers." J. Vac. Sci. Technol., 19(4), Nov./Dec. 1981, pp. 921-923.

SZE; VLSI Technology; 1988; pp. 198-199; $2^{nd}$ Edition; McGraw-Hill Publishing Company.

Takano et al.; "Cube polarizers by the use of metal particles in anodic alumina films." Applied Optics, vol. 33, No. 16, 3507-3512, Jun. 1, 1994.

Tyan et al.; "Polarizing beam splitter based on the anisotropic spectral reflectivity characteristic of form-birefringent multilayer gratings." Optics Letters, May 15, 1996, pp. 761-763, vol. 21, No. 10.

Tyan et al.; "Design, fabrication, and characterization of form-birefringent multilayer polarizing beam splitter." Optical Society of America, vol. 14, No. 7, pp. 1627-1636, Jul. 1997.

U.S. Appl. No. 13/937,433; filed Jul. 9, 2013; Paul Steven Mills.

Wang et al.; "Diffractive optics: nanoimprint lithography enables fabrication of subwavelength optics." LaserFocusWorld, http://lfw.pennnet.com/Articles/Article Dispaly.cf . . . Apr. 19, 2006, 6 pages.

Wang et al.; "Fabrication of a new broadband waveguide polarizer with a double-layer 190 nm period metal-gratings using nanoimprint lithography." Journal Vac. Sci. Technology B, Nov./Dec. 1999, pp. 2957-2960, vol. 17, No. 6.

Wang et al.; "High-performance large-area ultra-broadband (UV to IR) nanowire-grid polarizers and polarizing beam-splitters." Proc. of SPIE 2005, pp. 1-12, vol. 5931.

Wang et al.; "High-performance nanowire-grid polarizers" Optical Society of America. 2005, pp. 195-197, vol. 30, No. 2.

Wang et al.; "Monolithically integrated isolators based on nanowire-grid polarizers." IEEE, Photonics Technology Letters, Feb. 2005, pp. 396-398, vol. 17, No. 2.

Wang, et al.; "Innovative High-Performance Nanowire-Grid Polarizers and integrated Isolators," IEEE Journal of Selected Topics in Quantum Electronics, pp. 241-253, vol. 11 No. 1 Jan./Feb. 2005.

Wang et al.; "Free-Space nano-optical devices and integration: design, fabrication, and manufacturing." Bell Labs Technical Journal, 2005 pp. 107-127, vol. 10, No. 3.

Whitbourn et al.; "Phase shifts in transmission line models of thin periodic metal grids." Applied Optics Aug. 15, 1989 vol. 28, No. 15, pp. 3511-3515.

Zhang et al.; "A broad-angle polarization beam splitter based on a simple dielectric periodic structure." Optics Express, Oct. 29, 2007, 6 pages, vol. 15, No. 22.

\* cited by examiner

POLARIZER WITH WIRE PAIR OVER RIB

CLAIM OF PRIORITY

This claims priority to U.S. Provisional Patent Application Nos. 61/924,569, filed on Jan. 7, 2014, 61/924,560, filed on Jan. 7, 2014, 61/895,225, filed on Oct. 24, 2013, which are hereby incorporated herein by reference in their entirety.

FIELD OF THE INVENTION

The present application is related generally to wire grid polarizers.

BACKGROUND

Wire grid polarizers may be used for polarizing light, by allowing one polarization of light to pass through the polarizer, and reflecting or absorbing an opposite polarization of light. For simplicity, the polarization that primarily passes through the polarizer will be hereafter referred to as p-polarized light and the polarization that is primarily reflected or absorbed will be hereafter referred to as s-polarized light. Goals of wire grid polarizer design include increasing transmission of p-polarized light, decreasing transmission of s-polarized light, and increasing reflection or absorption of s-polarized light. Different applications have different requirements.

The goals of increasing transmission of p-polarized light and decreasing transmission of s-polarized light are common to most or all applications. There can be a trade-off between these two. In other words, certain designs that may increase transmission of p-polarized light may also undesirably increase transmission of s-polarized light. Other designs that decrease transmission of s-polarized light may also undesirably decrease transmission of p-polarized light.

For some applications, it is desirable to reflect as much s-polarized light as possible so that both polarized light beams can be effectively utilized. It can be important in such designs to increase reflection of s-polarized light without reducing transmission of p-polarized light. Sometimes there is a trade-off in a particular design between increasing transmission of p-polarized light and increasing reflection of s-polarized light.

For other applications, absorption of s-polarized light may be preferred, such as for example if reflection of light can disrupt the image or other intended use. In a transmissive panel image projection system, reflected light may go back into the LCD imager causing image degradation, or stray light can reach the screen, degrading contrast. An ideal selectively absorptive wire grid polarizer will transmit all p-polarized light and selectively absorb all s-polarized light. In reality, some s-polarized light is transmitted and some reflected and some p-polarized light is absorbed and some reflected. Sometimes there is a trade-off in a particular design between increasing transmission of p-polarized light and increasing absorption of s-polarized light.

The effectiveness of a wire grid polarizer can thus be quantified by (1) high transmission of p-polarized light; (2) high contrast; and (3) depending on the design, high absorption or reflection of s-polarized light. Contrast is equal to percent of p-polarized light transmitted (Tp) divided by percent of s-polarized light transmitted (Ts): Contrast=Tp/Ts.

It can be important in wire grid polarizers for infrared, visible, and ultraviolet light to have wires with small width and pitch, such as nanometer or micrometer width and pitch, for effective polarization. Typically, a pitch of less than half of the wavelength of light to be polarized is needed for effective polarization. Smaller pitches may improve the contrast. Thus, small pitch can be an important feature of wire grid polarizers. Manufacture of wire grid polarizers with sufficiently small pitch is challenging and is a goal of research in this field.

Small wires can be damaged by handling and by environmental conditions. Protection of the wires can be important in wire grid polarizers. Durability of wire grid polarizers is thus another important feature.

For example, see U.S. Pat. Nos. 5,991,075, 6,288,840, 6,665,119, 7,630,133, 7,692,860, 7,800,823, 7,961,393, and 8,426,121; U.S. Patent Publication Numbers US 2008/0055723, US 2009/0041971, and US 2009/0053655; U.S. patent application Ser. No. 13/326,566, filed on Dec. 15, 2011; "Application of 100 Å linewidth structures fabricated by shadowing techniques" by D.C. Flanders in J. Vac. Sci. Technol., 19(4), November/December 1981; and "Submicron periodicity gratings as artificial anisotropic dielectrics" by Dale C. Flanders in Appl. Phys. Lett. 42 (6), 15 Mar. 1983, pp. 492-494.

SUMMARY

It has been recognized that it would be advantageous to provide a durable wire grid polarizer with high transmission of p-polarized light, high contrast, and/or small pitch. High absorption or high reflection of s-polarized light, depending on the design, can also be important. The present invention is directed to various embodiments of, and methods of making, wire grid polarizers having a wire pair over a first rib. Each of the various embodiments or methods may satisfy one or more of these needs.

The wire grid polarizer can comprise an array of parallel, elongated nano-structures disposed over a surface of a substrate. Each of the nano-structures can include (1) a first rib disposed over the surface of the substrate; (2) a pair of parallel, elongated wires, each laterally oriented with respect to one another, and disposed over the first rib; and (3) a first gap between the pair of wires. There can be a plurality of second gaps, including a second gap disposed between adjacent first ribs. The substrate can be transmissive to incoming light.

A method of making a wire grid polarizer can comprise the following steps:
1. providing a substrate having an array of parallel, elongated support ribs disposed over a transmissive substrate with solid-material-free support-rib gaps between the support ribs;
2. conformal coating the substrate and the support ribs with a layer of material while maintaining the support-rib gaps between the support ribs;
3. etching the layer of material to remove horizontal segments and leaving an array of parallel, elongated wires along sides of the support ribs, including a pair of wires for each support rib with a wire disposed along each side of the support rib; and
4. using the wires as a mask and etching the support ribs between two wires of the pair of wires and etching the substrate between adjacent pairs of wires forming an array of parallel elongated first ribs, with each pair of wires disposed over a single first rib.

Figure 1:
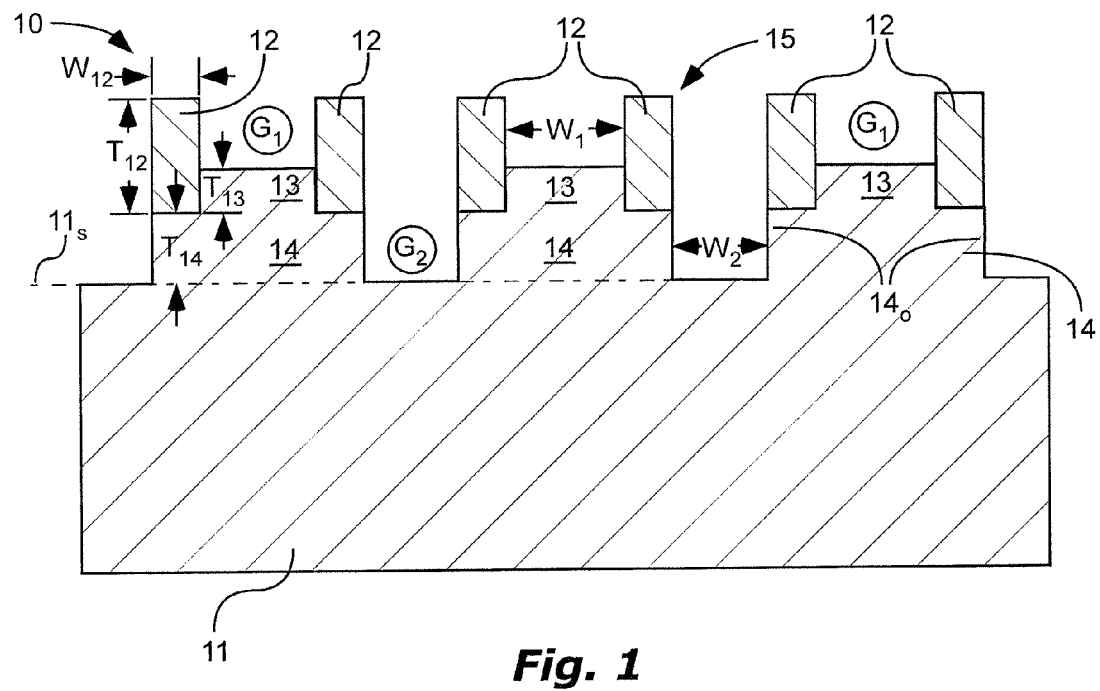
FIG. 1 shows a wire grid polarizer 10 which includes a support rib 13 disposed over the first rib 14 between the pair of wires 12 and extending partially into the first gap $G_1$.

REFERENCE NUMBERS IN THE DRAWINGS 10 wire grid polarizer
11 substrate
$11_s$ substrate surface
12 wire
$12_b$ wire base
$12_t$ wire top
13 support rib
$13_t$ support rib top
14 first rib
$14_o$ first rib outer edge
$14_t$ first rib top
15 nano-structure
20 wire grid polarizer
30 wire grid polarizer
34 second rib
70 wire grid polarizer
41 fill material
$41_a$ fill material in the first gap
$41_b$ fill material in the second gap
42 side bar
80 wire grid polarizer
90 wire grid polarizer
100 wire grid polarizer
110 wire grid polarizer
112 layer of material
$112_h$ horizontal segment of the layer of material
$112_v$ vertical segment of the layer of material
172 second layer of material
$172_h$ horizontal segment of the second layer of material
$172_v$ vertical segment of the second layer of material
G gap—first gap and/or second gap
$G_1$ first gap
$G_2$ second gap
$G_s$ support-rib gap
$T_{12}$ wire thickness
$T_{13}$ support rib thickness
$T_{14}$ first rib thickness
$T_{34}$ second rib thickness
$W_1$ first gap width
$W_2$ second gap width
$W_{12}$ wire width
$W_{13}$ support rib width
$W_{112}$ layer of material width
$W_{Gs}$ support rib gap width

DEFINITIONS

Many materials used in optical structures absorb some light, reflect some light, and transmit some light. The following definitions are intended to distinguish between materials or structures that are primarily absorptive, primarily reflective, or primarily transmissive.

1. As used herein, the term "absorptive" means substantially absorptive of light in the wavelength of interest.
   a. Whether a material is "absorptive" is relative to other materials used in the polarizer. Thus, an absorptive structure will absorb substantially more than a reflective or a transmissive structure.
   b. Whether a material is "absorptive" is dependent on the wavelength of interest. A material can be absorptive in one wavelength range but not in another.
   c. In one aspect, an absorptive structure can absorb greater than 40% and reflect less than 60% of light in the wavelength of interest (assuming the absorptive structure is an optically thick film—i.e. greater than the skin depth thickness).
   d. Absorptive ribs can be used for selectively absorbing one polarization of light.
2. As used herein, the term "reflective" means substantially reflective of light in the wavelength of interest.
   a. Whether a material is "reflective" is relative to other materials used in the polarizer. Thus, a reflective structure will reflect substantially more than an absorptive or a transmissive structure.
   b. Whether a material is "reflective" is dependent on the wavelength of interest. A material can be reflective in one wavelength range but not in another. Some wavelength ranges can effectively utilize highly reflective materials. At other wavelength ranges, especially lower wavelengths where material degradation is more likely to occur, the choice of materials may be more limited and an optical designer may need to accept materials with a lower reflectance than desired.
  c. In one aspect, a reflective structure can reflect greater than 80% and absorb less than 20% of light in the wavelength of interest (assuming the reflective structure is an optically thick film—i.e. greater than the skin depth thickness).
  d. Reflective wires can be used for separating one polarization of light from an opposite polarization of light.
  e. Metals are often used as reflective materials.
3. As used herein, the term "transmissive" means substantially transmissive to light in the wavelength of interest.
  a. Whether a material is "transmissive" is relative to other materials used in the polarizer. Thus, a transmissive structure will transmit substantially more than an absorptive or a reflective structure.
  b. Whether a material is "transmissive" is dependent on the wavelength of interest. A material can be transmissive in one wavelength range but not in another.
  c. In one aspect, a transmissive structure can transmit greater than 90% and absorb less than 10% of light in the wavelength of interest.
4. As used in these definitions, the term "material" refers to the overall material of a particular structure. Thus, a structure that is "absorptive" is made of a material that as a whole is substantially absorptive, even though the material may include some reflective or transmissive components. Thus for example, a rib made of a sufficient amount of absorptive material so that it substantially absorbs light is an absorptive rib even though the rib may include some reflective or transmissive material embedded therein.
5. As used herein, the term "light" can mean light or electromagnetic radiation in the x-ray, ultraviolet, visible, and/or infrared, or other regions of the electromagnetic spectrum.
6. As used herein, the term "substrate" includes a base material, such as for example a glass wafer. The term "substrate" includes a single material, and also includes multiple materials, such as for example a glass wafer with at least one thin film on a surface of the wafer used together as the base material.

DETAILED DESCRIPTION

As illustrated in FIGS. 1-11, wire grid polarizers 10, 20, 30, 40, 50, 60, 70, 80, 90, 100, and 110 are shown comprising an array of parallel, elongated nano-structures 15 disposed over a surface $11_s$ of a substrate 11. Each of the nano-structures 15 can include (1) a first rib 14 disposed over the surface $11_s$ of the substrate 11; (2) a pair of parallel, elongated wires 12, each laterally oriented with respect to one another, and disposed over the first rib 14; and (3) a first gap $G_1$ between the pair of wires 12. The wires 12 can be disposed at outer lateral edges $14_o$ of the first ribs 14. There can be a plurality of second gaps $G_2$ including a second gap $G_2$ disposed between adjacent first ribs 14.

Figure 4:
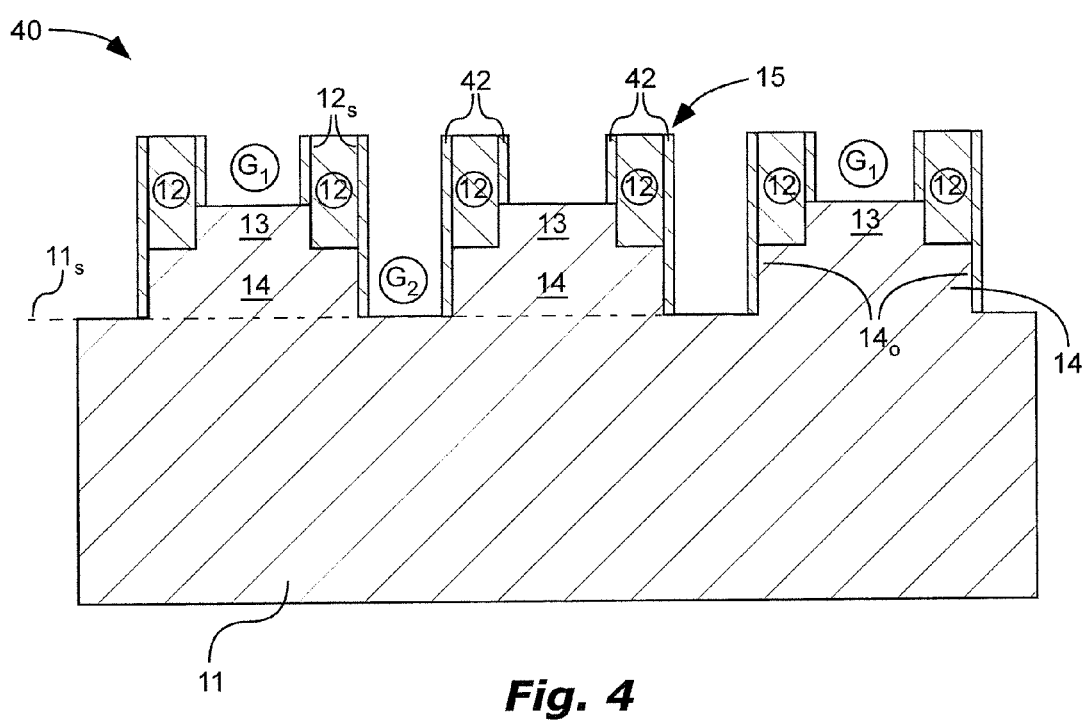
FIGS. 4-6 show wire grid polarizers 40, 50, and 60 which are similar to wire grid polarizers 10, 20, and 30 respectively, but with the addition of a pair of parallel, elongated side bars 42, each laterally oriented with respect to one another, including a side bar 42 disposed along and adjoining each side $12_s$ of each wire 12.
Figure 5:
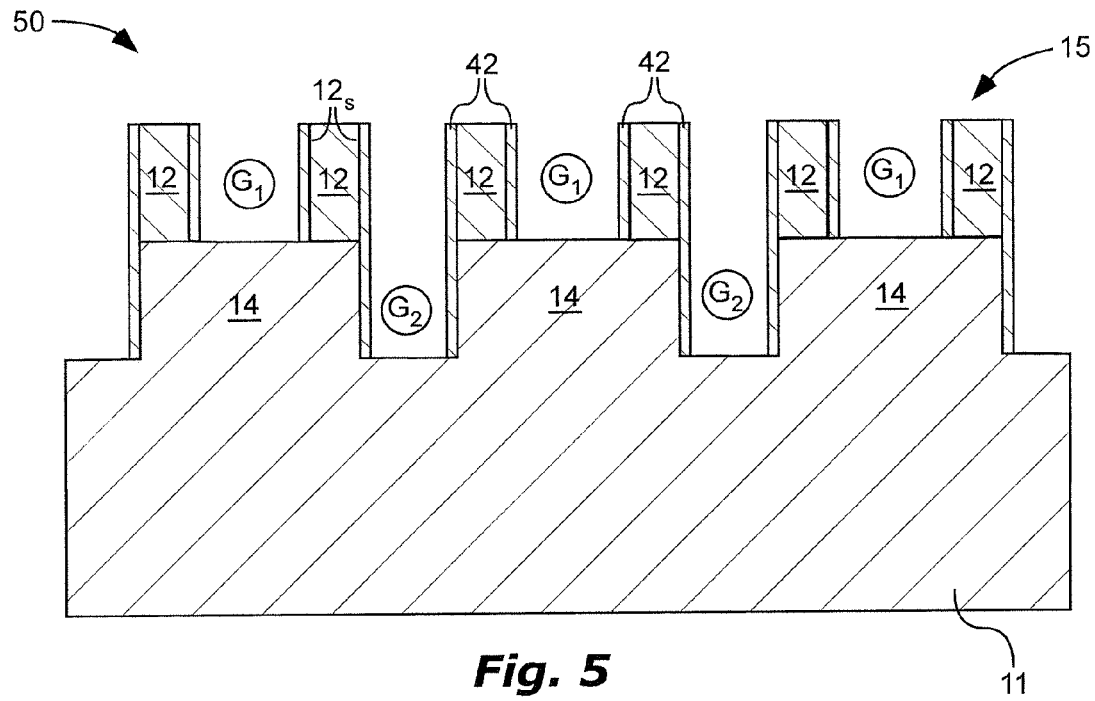
Figure 6:
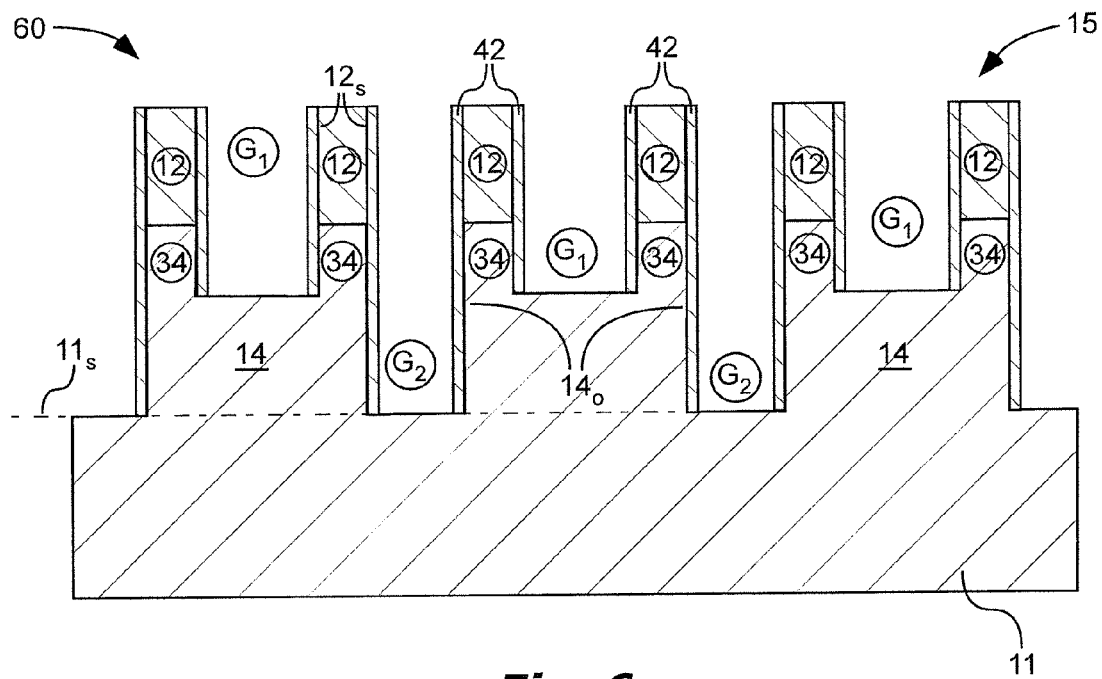

As illustrated in FIGS. 4-6, wire grid polarizers 40, 50, and 60 are similar to wire grid polarizers 10, 20, and 30 respectively, but with the addition of a pair of parallel, elongated side bars 42, each laterally oriented with respect to one another, including a side bar 42 disposed along and adjoining each side $12_s$ of each wire 12. These added side bars 42 can be beneficial for improving contrast and transmission of p-polarized light. The side bars 42 can also be beneficial for improved corrosion resistance. Side bars 42 can also be added to the polarizers shown in FIGS. 7-11.

The first rib 14, the pair of wires 12, and the side bars 42 can be made of the same or different materials. In one embodiment, at least one of the first rib 14, the pair of wires 12, and the side bars 42 can be absorptive and at least one of the first rib 14, the pair of wires 12, and the side bars 42 can be reflective. At least one of the first rib 14, the pair of wires 12, and the side bars 42 can be transmissive. These designs can be effective selectively absorptive wire grid polarizers.

Figure 8:
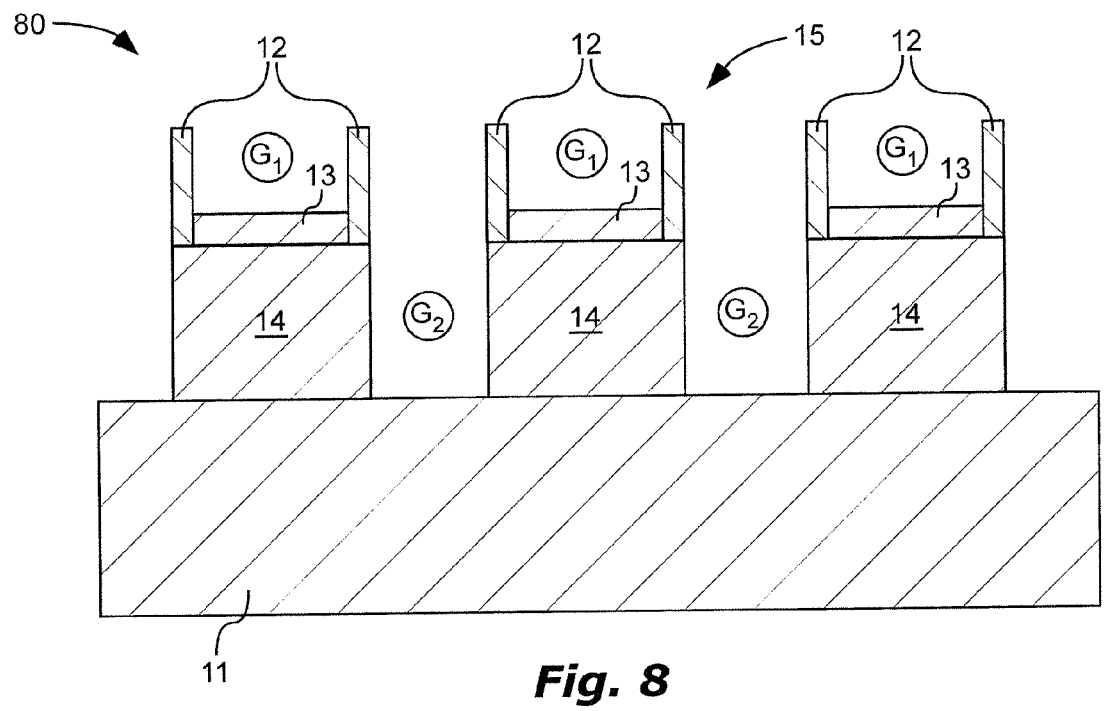
FIGS. 8-11 show wire grid polarizers 80, 90, 100, and 110, similar to the wire grid polarizers in FIGS. 1-6, but also showing that the wires 12, the support ribs 13, the first ribs 14, the second ribs 34, the fill material 41, and the substrate 11 can be separate regions and each region can be made of a different material than one, some, or all of the other regions.

As shown in FIGS. 1, 4, and 8, the wire grid polarizer 10 and 80 can further comprise a support rib 13 disposed over the first rib 14 between the pair of wires 12 and extending partially into the first gap $G_1$. The support rib 13 can provide structural support to the wires 12. Modeling has shown that the presence of the support rib can adversely affect contrast and transmission of p-polarized light (Tp). Thus, there can be a trade-off in design between a need for additional support for the wires 12 and a decrease in performance. Smaller wires (e.g. <50 nm wide) may need additional support, thus the support rib 13 may be needed for polarizers for lower wavelengths, such as the ultraviolet.

Use of a shorter or thinner support rib 13 can in some designs provide sufficient support with minimal degradation of performance. The wire grid polarizers of the present invention can include a support rib thickness $T_{13}$ that is between 5% and 35% of a wire thickness $T_{12}$ in one aspect, between 5% and 25% of a wire thickness $T_{12}$ in another aspect, or between 15% and 35% of a wire thickness $T_{12}$ in another aspect. These thicknesses can balance between support and performance.

The support rib 13, the first rib 14, and the substrate 11 can all be made of a single material. The support rib 13 and the first rib 14 can be formed by etching the substrate 11. The support rib 13, the first rib 14, and the substrate 11 can all be transmissive. The wires 12 can be reflective in order to polarize incoming light.

As indicated on polarizer 80 in FIG. 8, by lines separating the support rib 13, the first rib 14, and the substrate 11, these different regions can comprise different materials. Two of these regions can have the same material as another region or all three can have different materials. At least one of the support rib 13, the first rib 14, and the wires 12 can be absorptive. At least one of the support rib 13, the first rib 14, and the wires 12 can be transmissive. At least one of the support rib 13, the first rib 14, and the wires 12 can be reflective.

Figure 13:
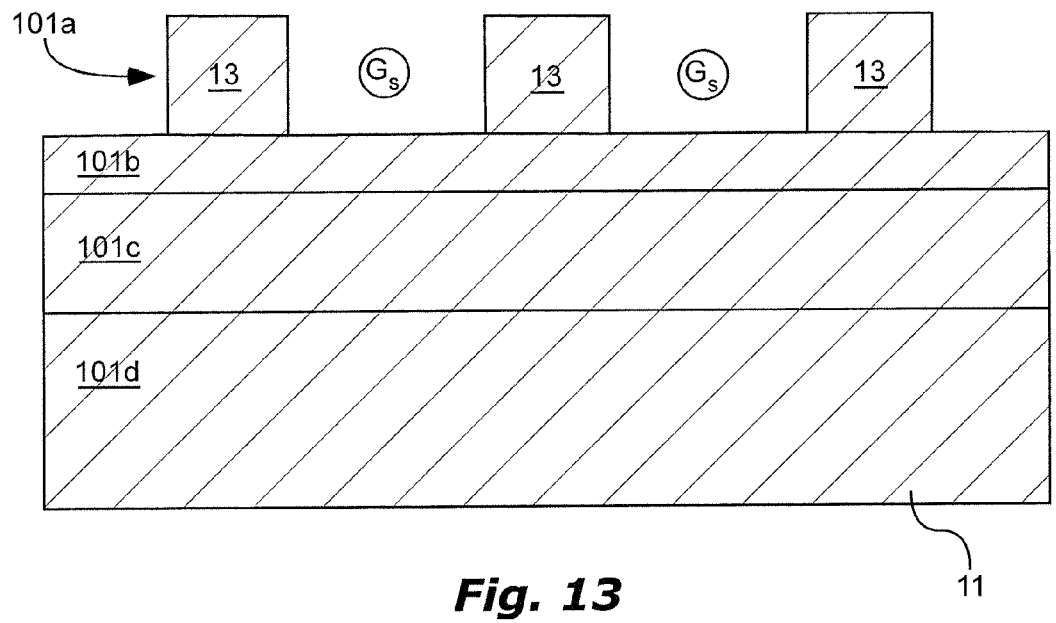
FIG. 13 shows that the substrate 11 can be divided into different regions 101b, 101c, and 101d (each region can be a different material from one or both of the other regions) and the support ribs 13 can be a different material 101a than one, some, or all of the other regions 101b, 101c, and 101d.

A polarizer in which the support rib 13, the first rib 14, and the substrate 11 include different regions with different materials can be made by initially selecting a substrate 11 which includes multiple thin film layers, then etching a top layer to form the support ribs 13, as shown in FIG. 13. As shown in FIG. 13, material 101a is the support rib material 13 and material 101b and possibly also 101c can be the first rib material 14.

Figure 2:
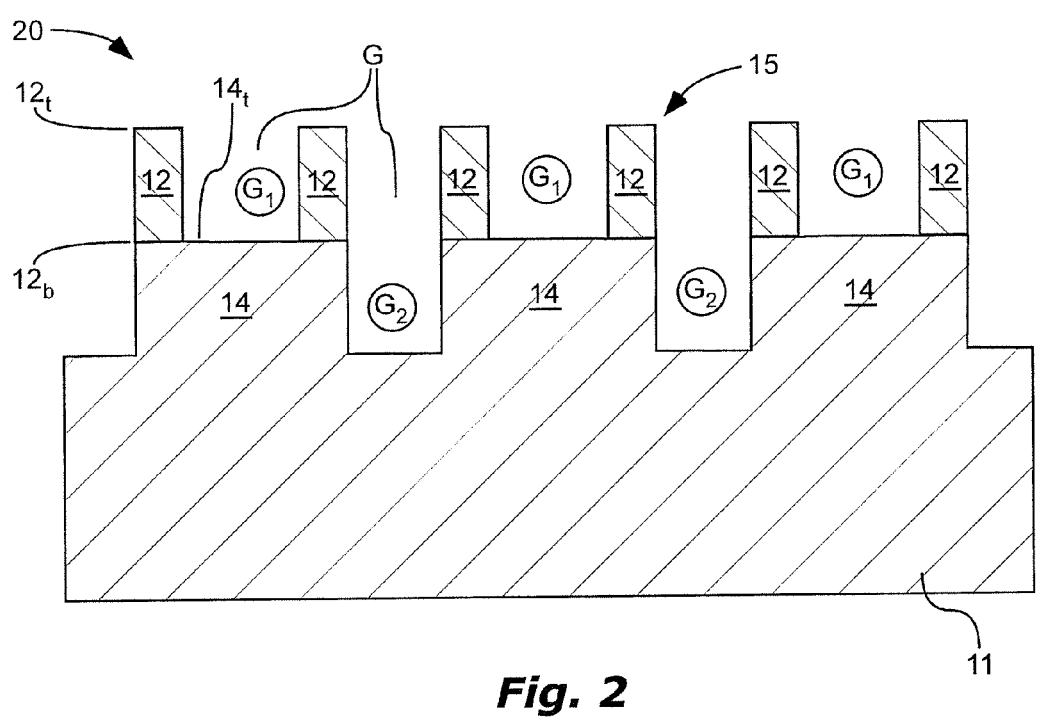
FIG. 2 shows a wire grid polarizer 20 wherein the first gaps G1 are solid-material-free gaps from a top $12_t$ of the wires 12 to a base $12_b$ of the wires 12.
Figure 9:
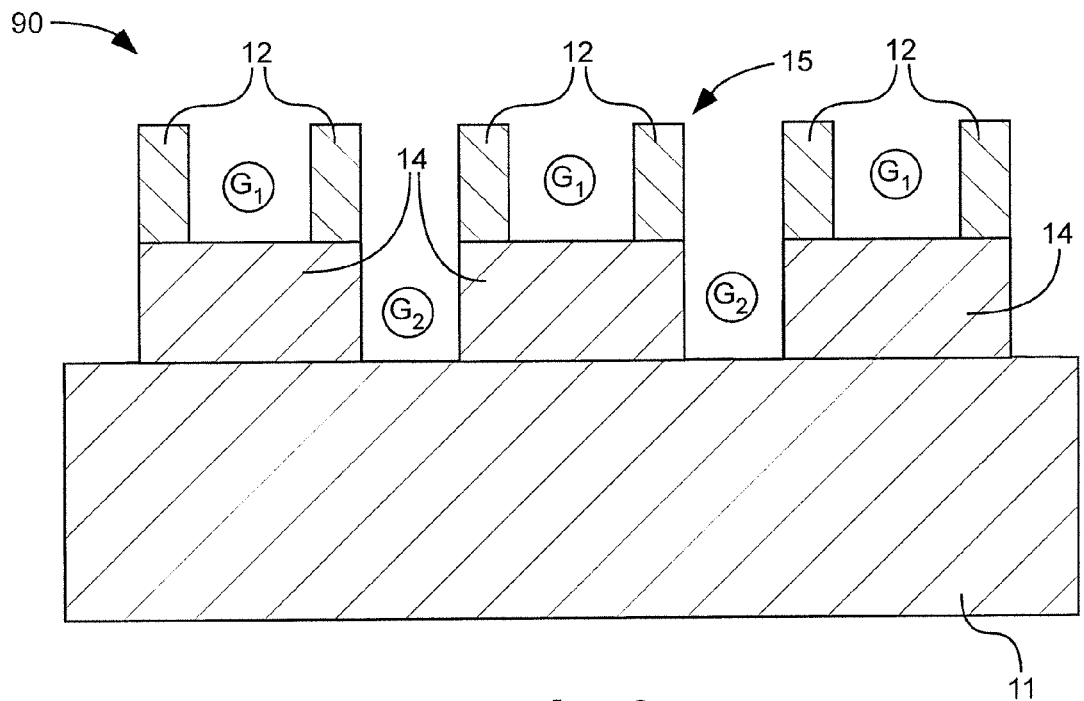
Figure 10:
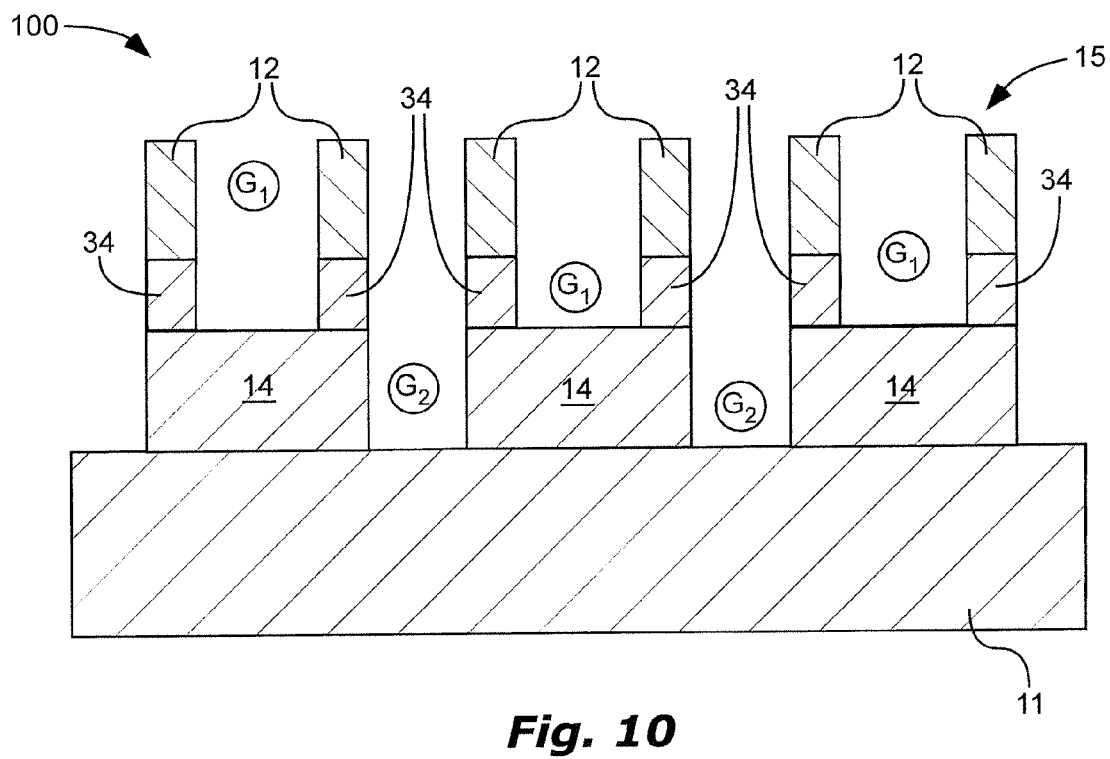

As shown on wire grid polarizers 20, 50, and 90 in FIGS. 2, 5, and 9, the support ribs 13 can be totally etched away down to a top $14_t$ of the first ribs 14. The first gaps $G_1$ can be solid-material-free gaps from a top $12_t$ of the wires 12 to a base $12_b$ of the wires 12. As shown on wire grid polarizer 20 in FIG. 2, the first ribs 14 can comprise the same material as the substrate 11, and both can be transmissive to incoming light. Alternatively, as shown on wire grid polarizer 90 in FIG. 9, the first ribs 14 can comprise a different material than the substrate 11. In one embodiment, one of the first ribs 14 or the wires 12 can be absorptive and the other of the first ribs 14 or the wires 12 can be reflective.

As shown in FIGS. 3, 6, 7, 10, and 11 wire grid polarizers 30, 60, 70, 100, and 110 can further comprise a pair of parallel, elongated second ribs 34 disposed over the first rib 14 at outer edges $14_o$ of the first rib 14. Each wire 12 of the pair of wires 12 can be disposed over a different second rib 34. The first gap $G_1$ can extend from between the pair of wires 12 down between the pair of second ribs 34. The second gap $G_2$ can extend from a top of the wires $12_t$, between adjacent pairs of wires 12, between adjacent pairs of second ribs 34, between adjacent first ribs 14, down to a base $14_b$ of the first ribs 14/surface 11s of the substrate 11.

Second rib thickness $T_{34}$ can affect wire grid polarizer performance. This effect on performance is wavelength dependent and can also dependent on first rib thickness $T_{14}$, especially in regard to contrast, but less so in regard to transmission of p-polarization (Tp). Thus, a wire grid polarizer designer may need to consider the intended wavelength range of use and the first rib thickness $T_{14}$ in an analysis of optimal second rib thickness $T_{34}$ for a given design. Second rib thickness $T_{34}$ may also relate to wire grid polarizer durability. Thus, both performance and durability requirements may need to be considered in determining optimal second rib thickness $T_{34}$.

As shown on wire grid polarizer 30, the first ribs 14, the second ribs 34, and the substrate 11 can all be formed of a single material and can all be transmissive of incoming light. The wires 12 can be reflective. The first ribs 14 and the second ribs 34 can be formed by etching into the substrate 11 and can be integrally formed from the substrate 11.

As shown on wire grid polarizer 100, the first ribs 14, the second ribs 34, and the substrate 11 can be different and separate regions. All three can be different materials or two of the regions can be the same material and a third can be a different material. At least one of the second ribs 34, the first ribs 14, or the wires 12 can be absorptive. At least one of the second ribs 34, the first ribs 14, or the wires 12 can be transmissive. At least one of the second ribs 34, the first ribs 14, or the wires 12 can be reflective. In one embodiment, the wires 12 or the second ribs 34 can be absorptive and the other of the wires 12 or the second ribs 34 can be reflective.

Figure 7:
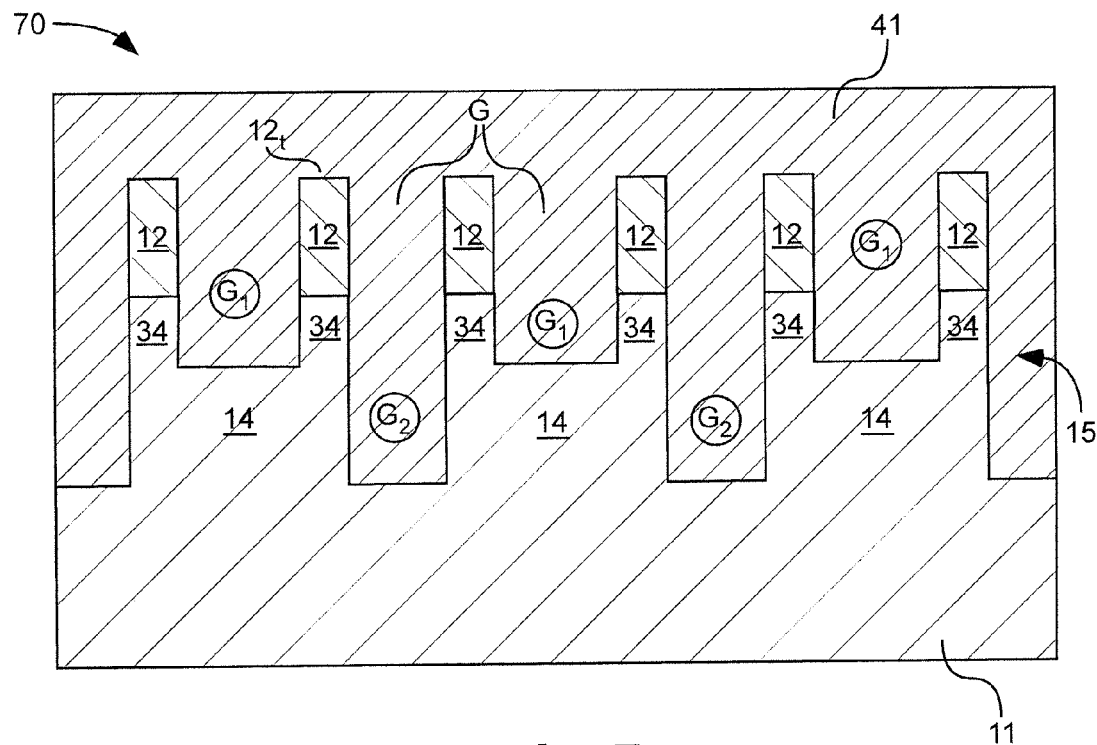
FIG. 7 shows a wire grid polarizer 70, similar to one of the wire grid polarizers 10, 20, 30, 40, 50, or 60 in FIGS. 1-6, but with the addition of a fill material 41 disposed in the gaps G and above tops $12_t$ of the wires 12.
Figure 11:
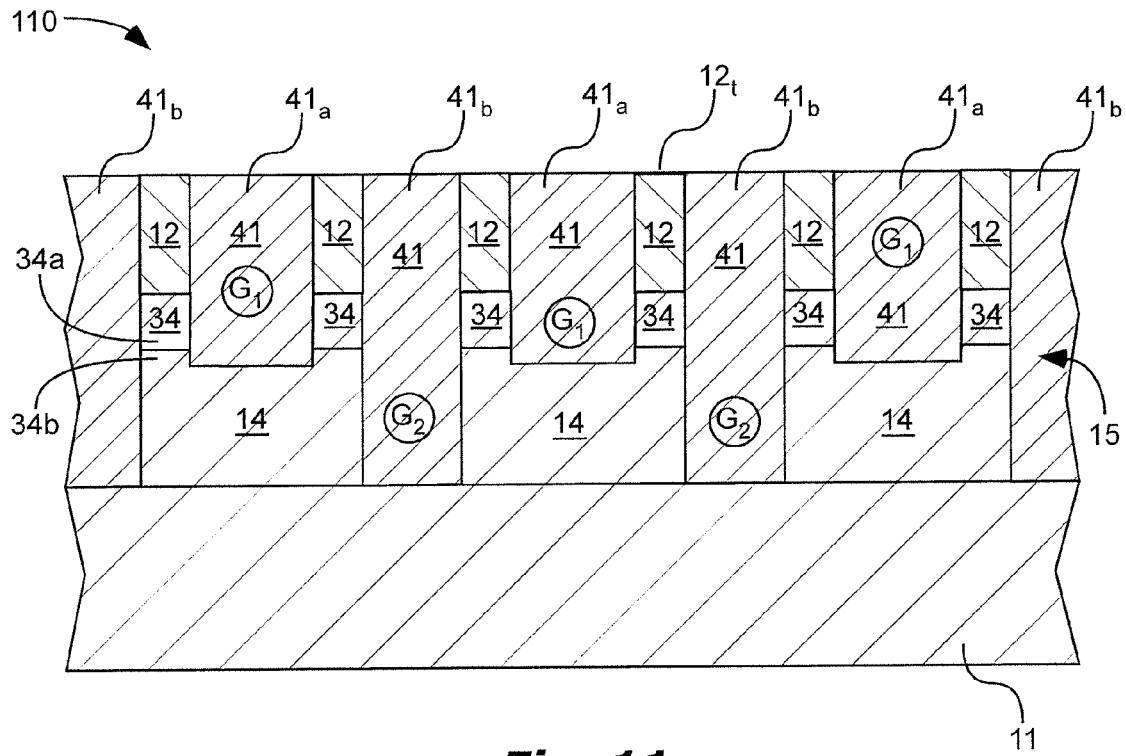

As shown in FIGS. 7 and 11, wire grid polarizers 70 and 110 can further comprise a fill material 41 disposed in the first gaps $G_1$ and in the second gaps $G_2$. Thus, the first gaps $G_1$ and the second gaps $G_2$ can be solid-material-free gaps. The fill material 41 can substantially or totally fill the first gaps $G_1$ and the second gaps $G_2$. The gaps G can be filled with fill material 41, such as by spin-on glass or ALD for example.

This filling or backfilling process can also add fill material 41 above tops $12_t$ of the wires 12, as shown in FIG. 7. This design can provide both structural strength and corrosion protection for the nano-structures. This design may be preferred if a transparent material is used as the fill material 41, such as for example glass for visible light polarization. The fill material 41 can in some designs substantially degrade polarizer performance, so fill material might be selected in these designs only if a need for structural strength and/or corrosion protection outweighs degradation in performance.

As shown in FIG. 11, fill material 41 in a gap G can be separate from fill material in an adjacent gap G. Fill material $41_a$ in the first gap $G_1$ can be separate from fill material $41_b$ in an adjacent second gap $G_2$. In other words, the fill material 41 does not extend over tops $12_t$ of the wires 12. This can be accomplished by beginning with wire grid polarizer 70, then etching the fill material 41 at least down to tops $12_t$ of the wires 12. By separating the fill material 41 in one gap G from fill material 41 in an adjacent gap G, the fill material 41 can be reflective for polarization of light or can be absorptive.

Wire grid polarizers 70 and 110, with fill material 41 in the gaps G, are illustrated with a wire grid polarizer design having the second ribs 34, similar to wire grid polarizers 30, 60, and 100; but use of the fill material 41 is not limited to these designs and the fill material 41 can be added to wire grid polarizer designs shown in the other figures as well, such as with polarizers 10, 20, 40, 50, 80, and 90 for example.

Various regions of a polarizer, with fill material 41 in one gap G separate from fill material in an adjacent gap G, can have different purposes. The following is related to having this separated fill material 41, as shown in FIG. 11. At least one of the support ribs 13 (if used), the second ribs 34 (if used), the first ribs 14, the wires 12, or the fill material 41 can be absorptive. At least one of the support ribs 13 (if used), the second ribs 34 (if used), the first ribs 14, the wires 12, or the fill material 41 can be transmissive. At least one of the support ribs 13 (if used), the second ribs 34 (if used), the first ribs 14, the wires 12, or the fill material 41 can be reflective.

Figure 3:
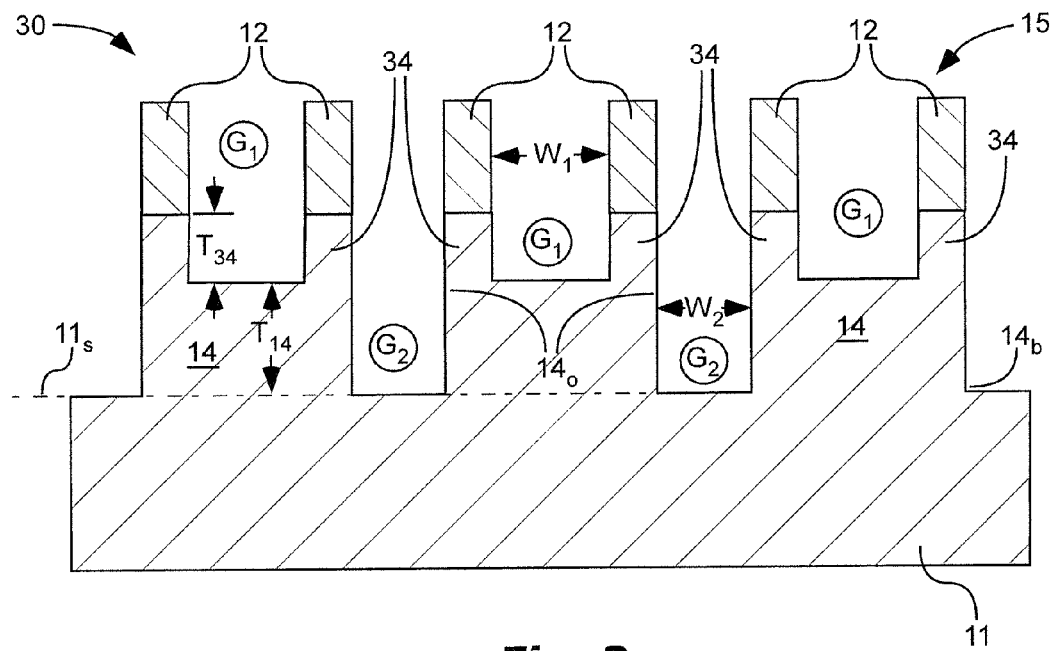
FIG. 3 shows a wire grid polarizer 30 which includes a pair of parallel, elongated second ribs 34 disposed over the first rib 14 at outer edges $14_o$ of the first rib 14, wherein each wire 12 of the pair of wires 12 is disposed over a different second rib 34, and wherein the first gap $G_1$ extends from between the pair of wires 12 down between the pair of second ribs 34.

As shown on wire grid polarizer 110 in FIG. 11, the second ribs 34 can be divided into two regions 34a and 34b with a different material in each region. This division may be applicable to a wire grid polarize with the fill material 41, as shown in FIGS. 7 & 11, or without the fill material 41, as shown in FIG. 3. The upper region 34a can be formed from one material 101b and the lower region 34b can be formed from a different material 101c (see FIG. 13). The lower region 34b can be the same material as, or a different material than, the first ribs 14.

Method to Make

Following are steps of a method of making a wire grid polarizer. This method can be performed in the order shown. The method need not include all of the following steps, depending on the wire grid polarizer design.

Figure 12:
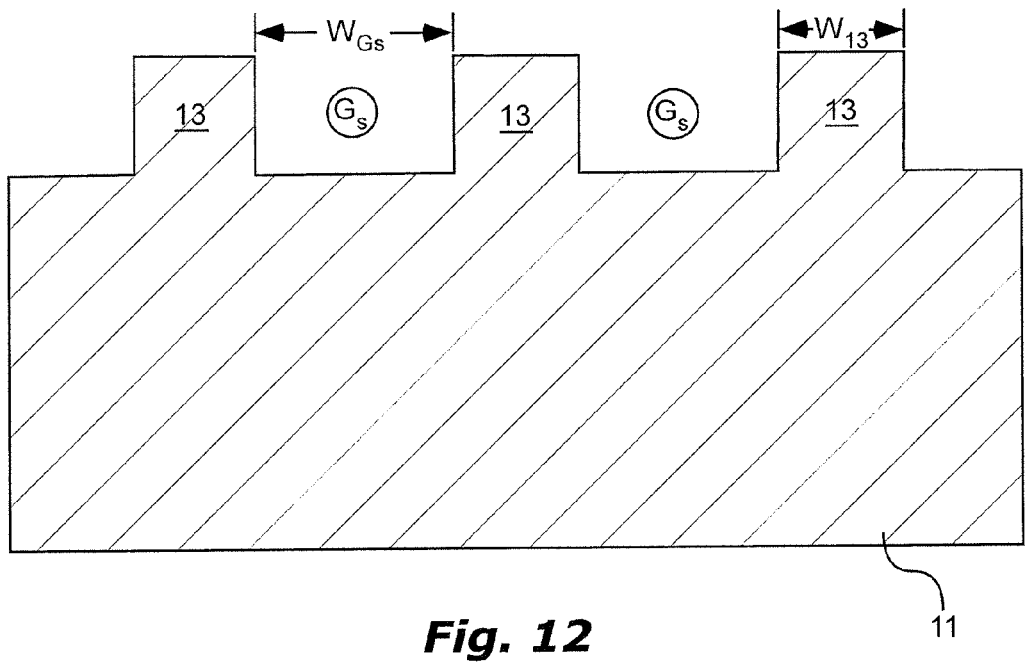
FIG. 12 shows a step of providing a substrate 11 having an array of parallel, elongated support ribs 13 disposed over the substrate 11 with solid-material-free support-rib gaps $G_s$ between the support ribs 13.
Figure 14:
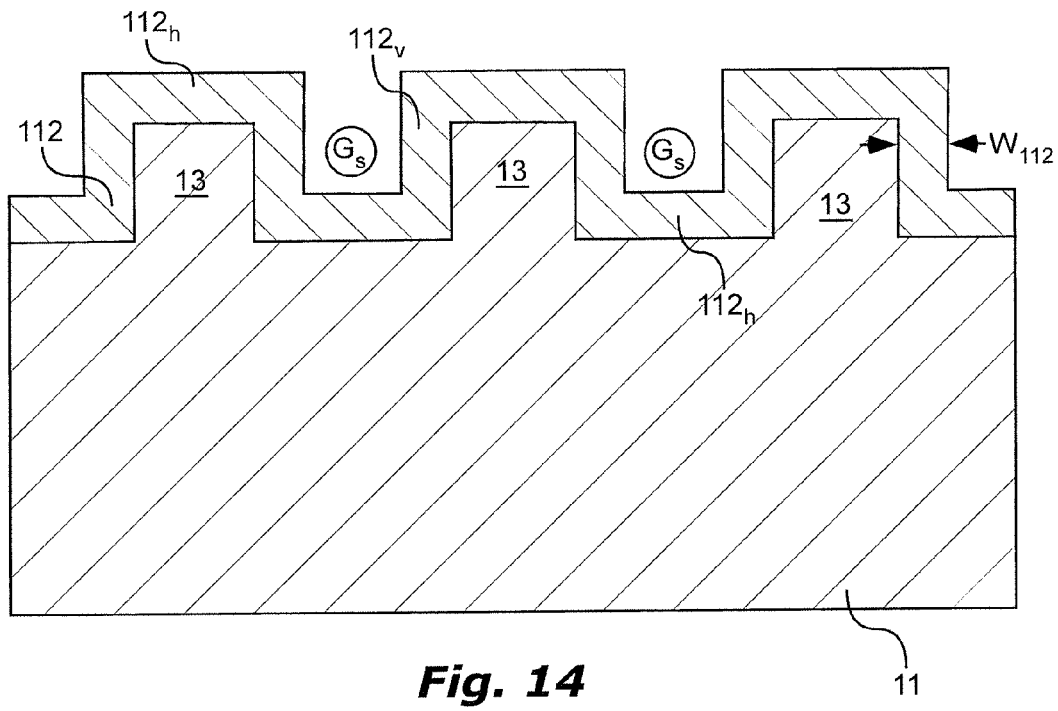
FIG. 14 shows a step of conformal coating the substrate 11 and the support ribs 13 with a layer of material 112 while maintaining the support-rib gaps $G_s$ between the support ribs 13.

1. Providing a substrate 11 having an array of parallel, elongated support ribs 13 disposed over the substrate 11 with solid-material-free support-rib gaps $G_s$ between the support ribs 13. See FIGS. 12 and 13.
   a. This step may be accomplished by patterning and etching a substrate 11.
   b. The substrate may be homogenous and made of a single material, such as a wafer of glass for example. The support ribs 13 can be formed by etching into the substrate 11 and thus can be integrally formed from, and made of the same material as, the substrate 11.
   c. Alternatively, the substrate 11 and the support ribs 13 can include multiple regions 101a-d, with different regions comprising different materials, to allow for different functions of different regions, such as is shown in FIGS. 8-11.
   d. Material 101a can be the support rib material 13 and can be the same as or different from substrate materials 101b, 101c, and/or 101d.
   e. Material 101b can become second rib 34 material and possibly part or all of the first rib 14 material and can be the same as or different from materials 101a, 101c, and/or 101d.
   f. Material 101c can be the first rib 14 material and possibly also a material for part of the second rib 34 and can be the same as or different from materials 101a, 101b, and/or 101d.
   g. Material 101d can be material of the final substrate and can be the same as or different from materials 101a, 101b, and/or 101c.
2. Conformal coating the substrate 11 and the support ribs 13 with a layer of material 112 while maintaining the support-rib gaps $G_s$ between the support ribs 13 (using a substrate 11 and support ribs 13 made of a single material as shown in FIG. 12 or a substrate and support ribs 13 made of layers of multiple materials as shown in FIG. 13). The conformal coating may be done by various methods, such as for example atomic layer deposition (ALD) or sputter. See FIG. 14. The layer of material 112 can be the material of the wires 12 that will be formed in the next step.

Figure 15:
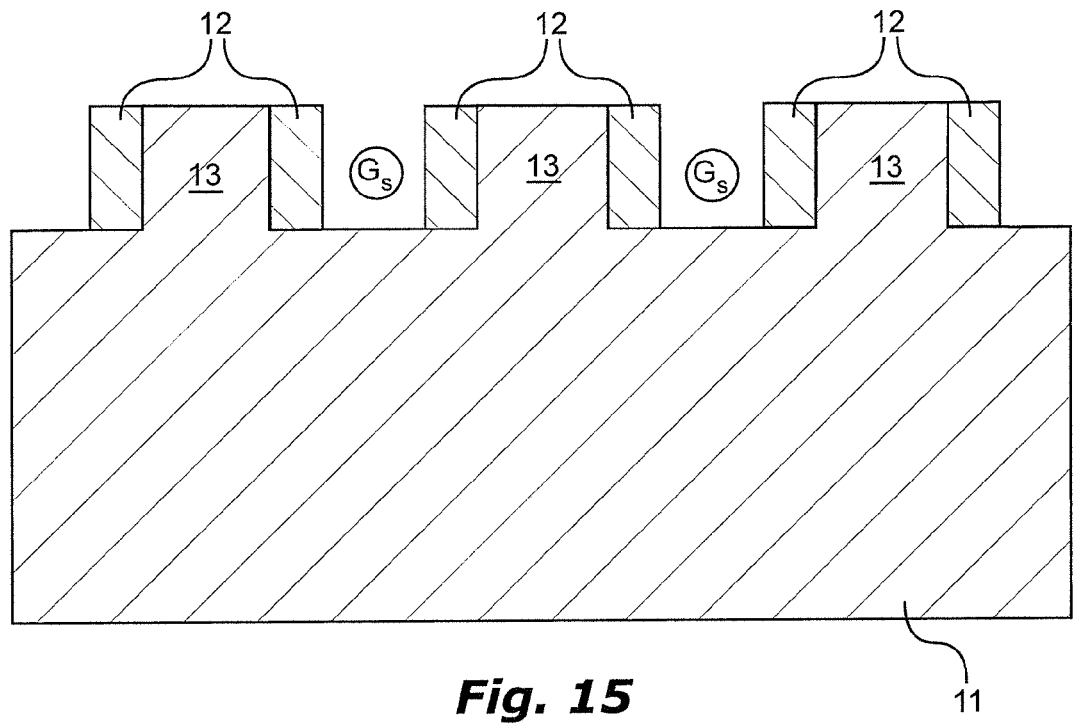
FIG. 15 shows a step of etching the layer of material 112 to remove horizontal segments $112_h$ and leaving an array of parallel, elongated wires 12 along sides of the support ribs 13, including a pair of wires 12 for each support rib 13 with a wire 12 disposed along each side of the support rib 13.

3. Etching the layer of material 112 to remove horizontal segments $112_h$ and leaving an array of parallel, elongated wires 12 along sides of the support ribs 13, including a pair of wires 12 for each support rib 13 with a wire 12 disposed along each side of the support rib 13. An anisotropic etch can etch away horizontal segments $112_h$ but leave most of the vertical segments $112_v$ due to the directional nature of this etch. See FIGS. 14-15.

Figure 16:
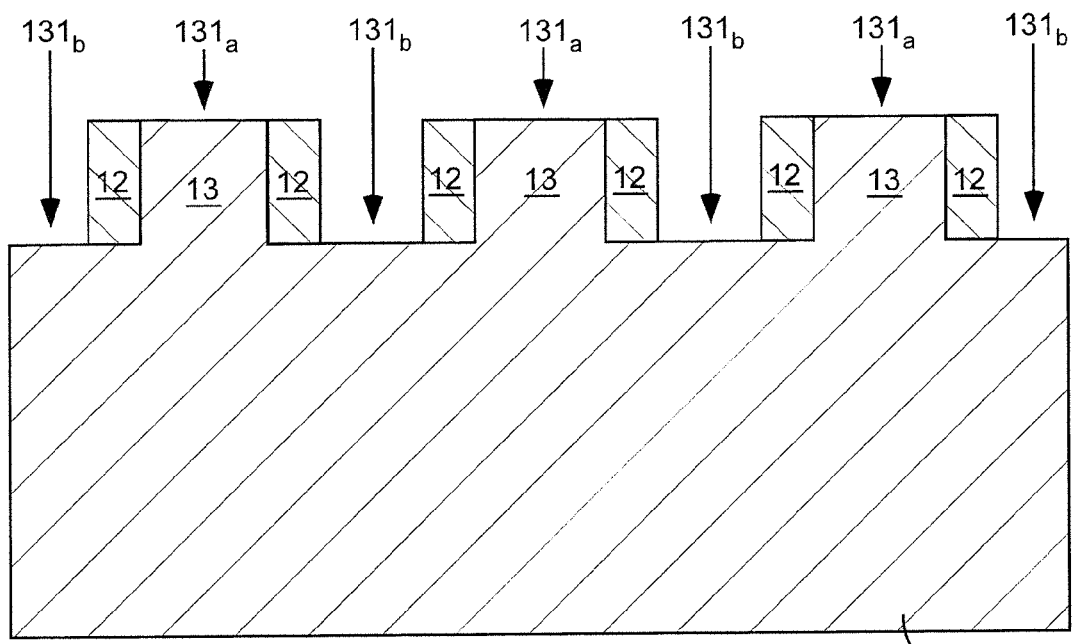
FIG. 16 shows a step of etching $131_a$ the support ribs 13 between two wires 12 of the pair of wires 12 and etching $131_b$ the substrate 11 between adjacent pairs of wires 12 forming the first ribs 14 as shown in FIGS. 1-11.
Figure 17:
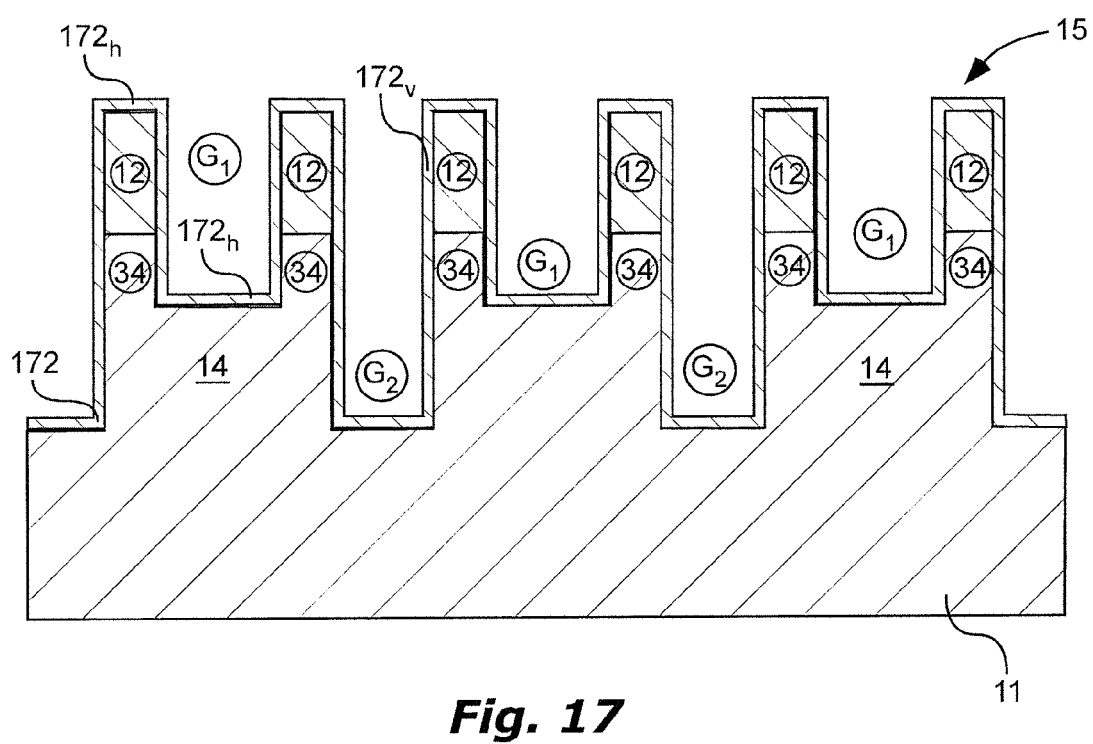
FIG. 17 shows a step of conformal coating the wires 12, the first ribs 14, the second ribs 34 (if used) and exposed portions of the substrate 11 with a second layer of material 172 while maintaining the first gap $G_1$ between the pair of wires 12 and the second gaps $G_2$ between adjacent first ribs 14.

4. Using the wires 12 as a mask to etch $131_a$ the support ribs 13 forming a first gap $G_1$ between two wires 12 of each pair of wires 12 and to etch $131_b$ the substrate 11 between adjacent pairs of wires 12 (see FIG. 16) forming an array of parallel elongated first ribs 14, with each pair of wires 12 disposed over a single first rib 14 and a plurality of second gaps $G_2$ including a second gap $G_2$ disposed between adjacent first ribs 14.

a. Etching $131_a$ the support ribs 13 to create the first gap $G_1$ between the wires 12 can improve wire grid polarizer performance.
   b. Etch chemistry and settings can be selected such that both the support ribs 13 and the substrate 11 are etched with minimal etch of the wires 12.
   c. Using the wires 12 as a mask to etch $131_a$ the support ribs 13 can include etching only part of the support ribs 13 such that a portion of the support ribs 13 remains in the first gaps $G_1$ between the wires. See FIGS. 1, 4, and 8. This may be preferred for added structural support for the wires 12.
   d. Using the wires 12 as a mask to etch $131_a$ the support ribs 13 can include etching $131_a$ away the entire support ribs 13 and stopping the etch between the pair of wires 12 substantially at a base $12_b$ of the wires 12 and at a top $14_t$ of the first ribs 14. See FIGS. 2, 5, and 9.
   e. Using the wires 12 as a mask to etch $131_a$ the support ribs 13 can include etching away substantially the entire support ribs 13 and can further comprise etching $131_a$ the first ribs 14 between two wires 12 of each pair of wires 12 forming a pair of parallel, elongated second ribs 34 disposed over and at outer edges $14_o$ of each of the first ribs 14 with a wire 12 disposed over each second rib 34. See FIGS. 3, 6, 7, 10, and 11. This may be preferred for improved wire grid polarizer performance, but may create wire grid polarizer durability concerns if wire 12 aspect ratio is too high and/or wire width is too small.

5. Backfilling the gaps G with fill material 41. The fill material 41 can be formed by spinning on a liquid that can harden upon evaporation of an included solvent. For example, spin-on a liquid glass in a solvent, then bake out the solvent. Another method is applying multiple layers by use of atomic layer deposition (ALD). See FIG. 7. Backfilling may be preferred as an additional step for improved wire grid polarizer durability, but can adversely affect wire grid polarizer performance, and thus durability requirements may need to be balanced against performance requirements.

6. Etching the fill material 41 at least down to tops $12_t$ of the wires 12 and separating fill material 41 in one gap G (e.g. $41_a$ in $G_1$) from fill material 41 in an adjacent gap G (e.g. $41_b$ in $G_2$). See FIG. 11. This may be preferred if the fill material 41 in the gaps G is an absorptive material to absorb one polarization or is a reflective material to separate polarization states.

7. Conformal coating the wires 12, the first ribs 14, the second ribs 34 (if used), and exposed portions of the substrate 11 with a second layer of material 172 while maintaining the first gap $G_1$ between the pair of wires and the second gaps $G_2$ between adjacent first ribs 14;

8. Etching the second layer of material 172 to remove horizontal segments $172_h$ and leaving an array of parallel, elongated side bars 42. An anisotropic etch can etch away horizontal segments $172_h$ but leave most of the vertical segments $172_v$ due to the directional nature of this etch. See FIGS. 4-6 and 17.

Gap Width ($W_1$ and $W_2$) Relationships

As shown in FIGS. 1 and 3, the first gap $G_1$ can have a first gap width $W_1$ and the second gap $G_2$ can have a second gap width $W_2$. The first gap width $W_1$ can be the same as the support rib width. The second gap width $W_2$ can be equal to the support rib gap width $W_{Gs}$ minus two times the wire width $W_{12}$ ($W_2 = W_{Gs} - 2*W_{12}$). Support rib gap width $W_{Gs}$ and support rib width $W_{13}$ can be controlled by the lithography technique (mask, interference lithography, etc.) used to make the support ribs 13. Wire width $W_{12}$ can be controlled by the layer of material width $W_{112}$, which can be determined by the deposition technique used (e.g. ALD or sputter) and duration of application of this layer of material 112. The ability to control separately the first gap width $W_1$ and the second gap width $W_2$ can give the wire grid polarizer designer considerable freedom for optimizing a wire grid polarizer design.

In some applications, it can be beneficial, for improved performance, durability, or manufacturing considerations, to equalize the gaps G. Thus, the first gap width $W_1$ can be substantially equal to a second gap width $W_2$.

In other applications, it can be beneficial, for improved performance, durability, or manufacturing considerations, to have non-equal gaps G. A larger of a first gap width $W_1$ or a second gap width $W_2$ divided by a smaller of the first gap width $W_1$ or the second gap width $W_2$ can be greater than 1.0 and less than or equal to 1.1

$$\left(1.0 < \frac{W_1}{W_2} \leq 1.1 \text{ or } 1.0 < \frac{W_2}{W_1} \leq 1.1\right).$$

A larger of a first gap width $W_1$ or a second gap width $W_2$ divided by a smaller of the first gap width $W_1$ or the second gap width $W_2$ can be greater or equal to than 1.1 and less than or equal to 1.5

$$\left(1.1 \leq \frac{W_1}{W_2} \leq 1.5 \text{ or } 1.1 \leq \frac{W_2}{W_1} \leq 1.5\right).$$

A difference between the first gap width $W_1$ and the second gap width $W_2$ can be between 0 nanometers and 30 nanometers in one aspect, between 25 nanometers and 50 nanometers in another aspect, or less than 60 nanometers in another aspect.

Measurement of gap width on an actual wire grid polarizer may be less precise than measurement on a drawing because the wires or ribs can lean to one side and can vary in width from top to bottom. Thus, if there question of where to measure in order to determine if the gap widths fall within these requirements, then measure at base $12_b$ of the wires 12.

General Information for all Embodiments

U.S. patent application Ser. No. 13/326,566, filed on Dec. 15, 2011, and U.S. Pat. Nos. 7,570,424 and 7,961,393, incorporated herein by reference in their entirety, provide examples of possible substrate materials, dielectric materials including absorptive dielectric materials and transmissive dielectric materials, and reflective materials for separating the light into two, opposite polarization states. The reflective materials can also be made of a semiconductor material doped to achieve a desired level of conductivity, or other types of conductors such as certain forms of carbon.

The wire grid polarizers described herein can be made with a relatively large wire 12 and/or side bar 42 aspect ratio (wire thickness divided by wire width—$Th_{12}/W_{12}$ or side bar thickness divided by side bar width). A large wire 12 aspect ratio can be accomplished by formation of relatively tall support ribs 13 in relation to a width $W_{112}$ of the layer of material 112 (which may approximate eventual wire width $W_{12}$). Modeling has shown good polarization characteristics with wire 12 and/or side bar aspect ratios of between 8 and 60 in one aspect, between 4 and 7 in another aspect, or between 3 and 8 in another aspect, depending on the wavelength for desired polarization and overall wire grid polarizer design. Modeling has shown good polarization characteristics with wire width $W_{12}$ of between 5 nm and 20 nm for polarization of some ultraviolet wavelengths. Modeling has shown good polarization characteristics with a wire thickness $Th_{12}$ of between 50 nm and 100 nm in one aspect, between 90 nm and 160 nm in another aspect, or between 150 nm and 300 nm in another aspect, depending on the wavelength for desired polarization. Modeling has shown that optimal first rib thickness $T_{14}$ is wavelength dependent.

Lithography techniques can limit a possible minimum pitch. Lithography techniques can provide a pitch of the support ribs 13, but two wires can be made for every support rib, thus effectively cutting the pitch in half. This small pitch can allow for more effective polarization and can allow polarization at lower wavelengths.

What is claimed is:

1. A wire grid polarizer comprising:
   an array of parallel, elongated nano-structures disposed over a surface of a substrate, each of the nano-structures including:
      a first rib disposed over the surface of the substrate;
      a pair of parallel, elongated wires, each laterally oriented with respect to one another, and disposed over the first rib;
      a first gap between the pair of wires; and
      each wire of the pair of wires has two opposite sides substantially orthogonal to the surface of the substrate;
   a plurality of second gaps including a second gap disposed between adjacent first ribs; and
   the substrate being transmissive.

2. The wire grid polarizer of claim 1, further comprising a pair of parallel, elongated side bars, each laterally oriented with respect to one another, including a side bar disposed along and adjoining each side of each wire.

3. The wire grid polarizer of claim 2, wherein:
   at least one of the first rib, the pair of wires, or the pair of side bars is absorptive; and
   at least one of the first rib, the pair of wires, or the pair of side bars is reflective.

4. The wire grid polarizer of claim 1, further comprising a support rib disposed above the first rib between the pair of wires and extending partially into the first gap.

5. The wire grid polarizer of claim 4, wherein a support rib thickness is between 5% and 35% of a wire thickness.

6. The wire grid polarizer of claim 1, further comprising a pair of parallel, elongated second ribs disposed over the first rib at outer edges of the first rib, wherein each wire of the pair of wires is disposed over a different second rib and the first gap extends from between the pair of wires down between the pair of second ribs.

7. The wire grid polarizer of claim 6, further comprising a pair of parallel, elongated side bars, each laterally oriented with respect to one another, including a side bar disposed along and adjoining each side of each wire and disposed along and adjoining each of two opposite sides of each second rib.

8. The wire grid polarizer of claim 7, wherein:
   at least one of the pair of second ribs, the first rib, the pair of wires, or the pair of side bars is absorptive; and
   at least one of the pair of second ribs, the first rib, the pair of wires, or the pair of side bars is reflective.

9. The wire grid polarizer of claim 1, wherein the first gaps and the second gaps are solid-material-free gaps.

10. The wire grid polarizer of claim 1, further comprising a fill material disposed in the first gaps and in the second gaps.

11. The wire grid polarizer of claim 10, wherein fill material in a gap is separate from fill material in an adjacent gap.

12. The wire grid polarizer of claim 11, wherein the fill material is absorptive.

13. The wire grid polarizer of claim 1, wherein a first gap width is substantially equal to a second gap width.

14. The wire grid polarizer of claim 1, wherein a larger of a first gap width or a second gap width divided by a smaller of the first gap width or the second gap width is greater than 1.0 and less than or equal to 1.1.

15. The wire grid polarizer of claim 1, wherein a larger of a first gap width or a second gap width divided by a smaller of the first gap width or the second gap width is greater than or equal to 1.1 and less than or equal to 1.5.

16. A method of making a wire grid polarizer, the method comprising the following steps in order:
   providing a substrate having an array of parallel, elongated support ribs disposed over the substrate with solid-material-free support-rib gaps between the support ribs, the substrate being substantially transmissive to incoming light;
   conformal coating the substrate and the support ribs with a layer of material while maintaining the support-rib gaps between the support ribs;
   etching the layer of material to remove horizontal segments and leaving an array of parallel, elongated wires along sides of the support ribs, including a pair of wires for each support rib with a wire disposed along each side of the support rib; and
   using the wires as a mask and etching the support ribs between two wires of the pair of wires and etching the substrate between adjacent pairs of wires forming:
      an array of parallel elongated first ribs, with each pair of wires disposed over a single first rib;
      a first gap between the pair of wires; and
      a plurality of second gaps including a second gap disposed between adjacent first ribs.

17. The method of claim 16, wherein etching the support ribs includes etching only part of the support ribs such that a portion of the support ribs remains in the first gaps between the wires.

18. The method of claim 16, wherein etching the support ribs includes etching away the entire support ribs and stopping the etch between the pair of wires substantially at a base of the wires and at a top of the first ribs.

19. The method of claim 16, wherein etching the support ribs includes substantially etching away the entire support ribs and then etching into the first ribs between two wires of each pair of wires forming a pair of parallel, elongated second ribs disposed over and at outer edges of each of the first ribs with a wire disposed over each second rib.

20. The method of claim 16, further comprising:
conformal coating the wires, the first ribs, and exposed portions of the substrate with a second layer of material while maintaining the first gap between the pair of wires and the second gaps between adjacent first ribs;
etching the second layer of material to remove horizontal segments and leaving an array of parallel, elongated side bars.

\* \* \* \* \*